(12) United States Patent
Asher et al.

(10) Patent No.: US 7,896,740 B2
(45) Date of Patent: Mar. 1, 2011

(54) EXCHANGE OF ENTRIES CORRESPONDING TO PARTICIPANTS IN A SPORTS COMPETITION

(75) Inventors: Joseph M. Asher, New York, NY (US); Dominic Crosthwaite, London (GB); Howard W. Lutnick, New York, NY (US)

(73) Assignee: Cantor Index, LLC, New York, NY (US)

( * ) Notice: Subject to any disclaimer, the term of this patent is extended or adjusted under 35 U.S.C. 154(b) by 0 days.

(21) Appl. No.: 12/614,610

(22) Filed: Nov. 9, 2009

(65) Prior Publication Data

US 2010/0113135 A1      May 6, 2010

Related U.S. Application Data

(63) Continuation of application No. 10/822,484, filed on Apr. 12, 2004, now Pat. No. 7,641,549.

(60) Provisional application No. 60/462,176, filed on Apr. 11, 2003.

(51) Int. Cl.
 *A63F 9/24* (2006.01)
 *A63F 13/00* (2006.01)
 *G06F 17/00* (2006.01)
 *G06F 19/00* (2006.01)

(52) U.S. Cl. .............................. 463/26; 463/20; 463/25; 463/29; 463/23

(58) Field of Classification Search ............. 705/1, 705/1.1, 5, 7, 35–37, 43; 463/25, 26, 20, 463/23, 29, 40
See application file for complete search history.

(56) References Cited

U.S. PATENT DOCUMENTS

| 3,499,646 | A | 3/1970 | Burgess, Jr. et al. |
| 3,573,747 | A | 4/1971 | Adams et al. |
| 3,581,072 | A | 5/1971 | Nymeyer |
| 4,363,489 | A | 12/1982 | Chodak et al. |
| 4,378,942 | A | 4/1983 | Isaac |
| 4,412,287 | A | 10/1983 | Braddock, III |
| 4,597,046 | A | 6/1986 | Musmanno et al. |
| 4,674,044 | A | 6/1987 | Kalmus et al. |

(Continued)

FOREIGN PATENT DOCUMENTS

CN      1417731      5/2003

(Continued)

OTHER PUBLICATIONS

Newswire; "FunBets.com Jumps Into 2nd Place among Fantasy Sports Web Sites."; Dec. 15, 2000; pp. 1 and 2.*

(Continued)

*Primary Examiner*—Ella Colbert

(57) ABSTRACT

Entries in one or more sports competitions are determined and distributed to a plurality of users. The one or more sports competitions have one or more stages. In some implementations relating to a first sports competition, the entries include entries in which each of the entries corresponds to a respective team of a set of teams participating in the first sports competition. In some implementations relating to a second sports competition, the entries include entries in which each of the entries corresponds to a respective individual of a set of individuals participating in the second sports competition.

112 Claims, 2 Drawing Sheets

U.S. PATENT DOCUMENTS

| | | |
|---|---|---|
| 4,823,265 A | 4/1989 | Nelson |
| 4,874,177 A | 10/1989 | Girardin |
| 4,903,201 A | 2/1990 | Wagner |
| 4,918,603 A | 4/1990 | Hughes et al. |
| 4,962,950 A * | 10/1990 | Champion .................. 283/67 |
| 4,980,826 A | 12/1990 | Wagner |
| 5,077,665 A | 12/1991 | Silverman et al. |
| 5,101,353 A | 3/1992 | Lupien et al. |
| 5,108,115 A | 4/1992 | Berman et al. |
| 5,136,501 A | 8/1992 | Silverman et al. |
| 5,205,827 A | 4/1993 | Sober |
| 5,237,500 A | 8/1993 | Perg et al. |
| 5,270,922 A | 12/1993 | Higgins |
| 5,297,032 A | 3/1994 | Trojan et al. |
| 5,311,423 A | 5/1994 | Clark |
| 5,315,634 A | 5/1994 | Tanaka et al. |
| 5,375,055 A | 12/1994 | Togher et al. |
| 5,497,317 A | 3/1996 | Hawkins et al. |
| 5,508,731 A | 4/1996 | Kohorn |
| 5,508,913 A | 4/1996 | Yamamoto et al. |
| 5,537,314 A | 7/1996 | Kanter |
| 5,557,517 A | 9/1996 | Daugherty, III |
| 5,573,244 A * | 11/1996 | Mindes ........................ 463/26 |
| 5,586,937 A | 12/1996 | Menashe |
| 5,689,652 A | 11/1997 | Lupien et al. |
| 5,692,233 A | 11/1997 | Garman |
| 5,713,793 A | 2/1998 | Holte |
| 5,724,524 A | 3/1998 | Hunt et al. |
| 5,727,165 A | 3/1998 | Ordish et al. |
| 5,743,525 A * | 4/1998 | Haddad ...................... 273/139 |
| 5,794,219 A | 8/1998 | Brown |
| 5,799,287 A | 8/1998 | Dembo |
| 5,806,048 A | 9/1998 | Kiron et al. |
| 5,819,237 A | 10/1998 | Garman |
| 5,819,238 A | 10/1998 | Fernholz |
| 5,826,241 A | 10/1998 | Stein et al. |
| 5,842,148 A | 11/1998 | Prendergast et al. |
| 5,845,266 A | 12/1998 | Lupien et al. |
| 5,846,132 A * | 12/1998 | Junkin ........................ 463/42 |
| 5,888,136 A | 3/1999 | Herbert |
| 5,905,974 A | 5/1999 | Fraser et al. |
| 5,913,203 A | 6/1999 | Wong et al. |
| 5,924,082 A | 7/1999 | Silverman et al. |
| 5,946,667 A | 8/1999 | Tull, Jr. et al. |
| 5,950,176 A | 9/1999 | Keiser et al. |
| 5,950,177 A | 9/1999 | Lupien et al. |
| 5,970,479 A | 10/1999 | Shepherd |
| 6,009,402 A | 12/1999 | Whitworth |
| 6,012,046 A | 1/2000 | Lupien et al. |
| 6,014,643 A | 1/2000 | Minton |
| 6,016,483 A | 1/2000 | Rickard et al. |
| 6,021,397 A | 2/2000 | Jones et al. |
| 6,023,685 A | 2/2000 | Brett et al. |
| 6,026,364 A | 2/2000 | Whitworth |
| 6,026,388 A | 2/2000 | Liddy et al. |
| 6,029,146 A | 2/2000 | Hawkins et al. |
| 6,035,287 A | 3/2000 | Stallaert et al. |
| 6,058,377 A | 5/2000 | Traub et al. |
| 6,058,379 A | 5/2000 | Odom et al. |
| 6,064,985 A | 5/2000 | Anderson |
| 6,067,532 A | 5/2000 | Gebb |
| 6,088,685 A | 7/2000 | Kiron |
| 6,112,189 A | 8/2000 | Rickard et al. |
| 6,113,492 A | 9/2000 | Walker et al. |
| 6,120,376 A * | 9/2000 | Cherry ........................ 463/16 |
| 6,126,543 A | 10/2000 | Friedman |
| 6,152,822 A * | 11/2000 | Herbert ........................ 463/22 |
| 6,154,730 A | 11/2000 | Adams et al. |
| 6,236,900 B1 | 5/2001 | Geiger |
| 6,240,396 B1 | 5/2001 | Walker et al. |
| 6,260,019 B1 | 7/2001 | Courts |
| 6,260,024 B1 | 7/2001 | Shkedy |
| 6,263,321 B1 | 7/2001 | Daughtery, III |
| 6,278,981 B1 | 8/2001 | Dembo et al. |
| 6,296,569 B1 | 10/2001 | Congello, Jr. |
| 6,309,307 B1 | 10/2001 | Krause et al. |
| 6,325,721 B1 | 12/2001 | Miyamoto et al. |
| 6,331,148 B1 | 12/2001 | Krause et al. |
| 6,347,086 B1 | 2/2002 | Strachan |
| 6,358,150 B1 | 3/2002 | Mir et al. |
| 6,360,210 B1 | 3/2002 | Wallman |
| 6,371,855 B1 | 4/2002 | Gavriloff |
| 6,418,417 B1 | 7/2002 | Corby et al. |
| 6,443,841 B1 | 9/2002 | Rossides |
| 6,450,887 B1 | 9/2002 | Mir et al. |
| 0,143,676 A1 | 10/2002 | Kiron et al. |
| 6,470,324 B1 | 10/2002 | Brown et al. |
| 6,482,091 B1 | 11/2002 | Kobayashi et al. |
| 6,505,174 B1 | 1/2003 | Keiser et al. |
| 6,527,270 B2 | 3/2003 | Maksymec et al. |
| 6,578,010 B1 | 6/2003 | Teacherson |
| 6,598,028 B1 | 7/2003 | Sullivan et al. |
| 6,669,565 B2 * | 12/2003 | Liegey ........................ 463/42 |
| 6,688,978 B1 | 2/2004 | Herman |
| 6,692,916 B2 | 2/2004 | Bevilacqua et al. |
| 6,711,550 B1 | 3/2004 | Lewis et al. |
| 6,792,411 B1 | 9/2004 | Massey, Jr. |
| 6,837,791 B1 | 1/2005 | McNutt et al. |
| 6,910,965 B2 * | 6/2005 | Downes ........................ 463/28 |
| 6,925,446 B2 | 8/2005 | Watanabe |
| 6,939,137 B1 | 9/2005 | Colaio et al. |
| 7,001,279 B1 | 2/2006 | Barber et al. |
| 7,003,485 B1 | 2/2006 | Young |
| 7,006,991 B2 | 2/2006 | Keiser et al. |
| 7,031,938 B2 | 4/2006 | Fraivillig et al. |
| 7,062,457 B1 | 6/2006 | Kaufman |
| 7,076,459 B2 | 7/2006 | Zhang et al. |
| 7,099,838 B1 | 8/2006 | Gastineau et al. |
| 7,099,839 B2 | 8/2006 | Madoff et al. |
| 7,110,961 B1 * | 9/2006 | Goino ........................ 705/14.14 |
| 7,124,106 B1 | 10/2006 | Stallaert et al. |
| 7,146,334 B2 | 12/2006 | Hogg et al. |
| 7,152,041 B2 | 12/2006 | Salavadori et al. |
| 7,162,447 B1 | 1/2007 | Cushing |
| 7,171,385 B1 | 1/2007 | Dembo et al. |
| 7,171,386 B1 | 1/2007 | Raykhman |
| 7,172,508 B2 * | 2/2007 | Simon et al. .................. 463/42 |
| 7,174,517 B2 | 2/2007 | Barnett et al. |
| 7,236,955 B2 | 6/2007 | Sugahara |
| 7,249,081 B2 | 7/2007 | Shearer et al. |
| 7,263,504 B2 | 8/2007 | Galai et al. |
| 7,321,871 B2 | 1/2008 | Scott et al. |
| 7,340,425 B2 | 3/2008 | Boyle et al. |
| 7,395,232 B1 | 7/2008 | Pilato |
| 7,409,367 B2 | 8/2008 | McGill et al. |
| 7,438,640 B2 | 10/2008 | Amour |
| 7,487,123 B1 | 2/2009 | Keiser et al. |
| 7,567,931 B2 | 7/2009 | Asher et al. |
| 7,567,935 B2 | 7/2009 | Tell et al. |
| 7,571,130 B2 | 8/2009 | Weber et al. |
| 7,641,549 B2 | 1/2010 | Asher et al. |
| 7,818,225 B2 | 10/2010 | Gula, IV |
| 2001/0003099 A1 | 6/2001 | Von Kohorn |
| 2001/0039209 A1 | 11/2001 | DeWeese et al. |
| 2001/0042785 A1 | 11/2001 | Walker et al. |
| 2001/0047291 A1 | 11/2001 | Garahi et al. |
| 2002/0019792 A1 | 2/2002 | Maerz et al. |
| 2002/0023035 A1 | 2/2002 | Kiron et al. |
| 2002/0023037 A1 | 2/2002 | White |
| 2002/0026390 A1 | 2/2002 | Ulenas et al. |
| 2002/0032641 A1 | 3/2002 | Mendiola et al. |
| 2002/0038270 A1 | 3/2002 | Shin et al. |
| 2002/0062243 A1 | 5/2002 | Anderson |
| 2002/0068633 A1 | 6/2002 | Schlaifer |

| | | | | | | |
|---|---|---|---|---|---|---|
| 2002/0073021 A1 | 6/2002 | Ginsberg et al. | | 2005/0044025 A1 | 2/2005 | Tutty et al. |
| 2002/0077880 A1 | 6/2002 | Gordon et al. | | 2005/0049731 A1 | 3/2005 | Dell |
| 2002/0082969 A1 | 6/2002 | O'Keeffe et al. | | 2005/0055302 A1 | 3/2005 | Wenger et al. |
| 2002/0087447 A1 | 7/2002 | McDonald et al. | | 2005/0064937 A1 | 3/2005 | Ballman |
| 2002/0094869 A1 | 7/2002 | Harkham | | 2005/0070251 A1 | 3/2005 | Satake et al. |
| 2002/0095369 A1 | 7/2002 | Kaplan et al. | | 2005/0071250 A1 | 3/2005 | Weisbach et al. |
| 2002/0099640 A1 | 7/2002 | Lange | | 2005/0080705 A1 | 4/2005 | Chaganti |
| 2002/0112014 A1 | 8/2002 | Bennett et al. | | 2005/0097022 A1 | 5/2005 | Silman |
| 2002/0115488 A1* | 8/2002 | Berry et al. ............ 463/42 | | 2005/0102215 A1 | 5/2005 | Ausubel et al. |
| 2002/0119793 A1 | 8/2002 | Hronek et al. | | 2005/0108131 A1 | 5/2005 | Halikias |
| 2002/0120490 A1 | 8/2002 | Gajewski et al. | | 2005/0125333 A1 | 6/2005 | Giannetti |
| 2002/0128951 A1 | 9/2002 | Kiron et al. | | 2005/0154629 A1 | 7/2005 | Matsuda et al. |
| 2002/0152458 A1 | 10/2002 | Eyer et al. | | 2005/0160020 A1 | 7/2005 | Asher et al. |
| 2002/0153656 A1 | 10/2002 | Maksymec et al. | | 2005/0160024 A1 | 7/2005 | Soderborg et al. |
| 2002/0156715 A1* | 10/2002 | Wall et al. ............ 705/37 | | 2005/0160028 A1 | 7/2005 | Asher et al. |
| 2002/0161622 A1 | 10/2002 | Zhang et al. | | 2005/0160029 A1 | 7/2005 | Asher et al. |
| 2002/0194097 A1 | 12/2002 | Reitz | | 2005/0209954 A1 | 9/2005 | Asher et al. |
| 2003/0008711 A1 | 1/2003 | Corbo | | 2005/0267836 A1 | 12/2005 | Crosthwaite et al. |
| 2003/0009415 A1 | 1/2003 | Lutnick et al. | | 2006/0003830 A1 | 1/2006 | Walker et al. |
| 2003/0018564 A1 | 1/2003 | Bonnier et al. | | 2006/0025208 A1 | 2/2006 | Ramsey |
| 2003/0018571 A1 | 1/2003 | Eckert et al. | | 2006/0026091 A1 | 2/2006 | Keen, Jr. et al. |
| 2003/0036395 A1 | 2/2003 | Proidl | | 2006/0069635 A1 | 3/2006 | Ram et al. |
| 2003/0036396 A1 | 2/2003 | Back et al. | | 2006/0080220 A1 | 4/2006 | Samuel et al. |
| 2003/0061096 A1 | 3/2003 | Gallivan et al. | | 2006/0085320 A1 | 4/2006 | Owens et al. |
| 2003/0065615 A1 | 4/2003 | Aschir | | 2006/0100006 A1 | 5/2006 | Mitchell et al. |
| 2003/0093356 A1 | 5/2003 | Kaufman | | 2006/0105840 A1 | 5/2006 | Graeve |
| 2003/0101128 A1 | 5/2003 | Abernethy | | 2006/0116950 A1 | 6/2006 | Poffenberger et al. |
| 2003/0130941 A1 | 7/2003 | Birle | | 2006/0123092 A1 | 6/2006 | Madams et al. |
| 2003/0154092 A1 | 8/2003 | Bouron et al. | | 2006/0143099 A1 | 6/2006 | Partlow et al. |
| 2003/0171980 A1 | 9/2003 | Keiser et al. | | 2006/0143110 A1 | 6/2006 | Keiser et al. |
| 2003/0172026 A1 | 9/2003 | Tarrant | | 2006/0173761 A1 | 8/2006 | Costakis |
| 2003/0177055 A1 | 9/2003 | Zimmerman, Jr. et al. | | 2006/0173764 A1 | 8/2006 | Costakis et al. |
| 2003/0199315 A1 | 10/2003 | Downes P.E. | | 2006/0195355 A1 | 8/2006 | Lundgren |
| 2003/0200164 A1 | 10/2003 | Jacobs | | 2006/0235783 A1 | 10/2006 | Ryles et al. |
| 2003/0204408 A1 | 10/2003 | Guler et al. | | 2006/0240852 A1 | 10/2006 | Al-Sarawi |
| 2003/0212623 A1 | 11/2003 | Aylmer et al. | | 2006/0259312 A1 | 11/2006 | DeTitta |
| 2003/0236734 A1 | 12/2003 | Guler et al. | | 2006/0259381 A1 | 11/2006 | Gershon |
| 2004/0015427 A1 | 1/2004 | Camelio | | 2006/0277135 A1 | 12/2006 | Jain et al. |
| 2004/0039685 A1 | 2/2004 | Hambrecht et al. | | 2006/0293985 A1 | 12/2006 | Lederman et al. |
| 2004/0049447 A1 | 3/2004 | Keiser et al. | | 2006/0293995 A1 | 12/2006 | Borgs et al. |
| 2004/0059646 A1 | 3/2004 | Harrington et al. | | 2007/0010314 A1 | 1/2007 | Tulley et al. |
| 2004/0059660 A1 | 3/2004 | Michael | | 2007/0054718 A1 | 3/2007 | Del Prado |
| 2004/0068738 A1 | 4/2004 | Kinoshita | | 2007/0060380 A1 | 3/2007 | McMonigle et al. |
| 2004/0078268 A1 | 4/2004 | Sprogis | | 2007/0061240 A1 | 3/2007 | Jain et al. |
| 2004/0078314 A1 | 4/2004 | Maerz et al. | | 2007/0073608 A1 | 3/2007 | Garcia |
| 2004/0088242 A1 | 5/2004 | Asher et al. | | 2007/0087815 A1 | 4/2007 | Van Luchene |
| 2004/0088244 A1 | 5/2004 | Bartter et al. | | 2007/0087816 A1 | 4/2007 | Van Luchene |
| 2004/0110552 A1 | 6/2004 | Del Prado | | 2007/0100729 A1 | 5/2007 | Chen |
| 2004/0111358 A1 | 6/2004 | Lange et al. | | 2007/0130040 A1 | 6/2007 | Stinski |
| 2004/0117302 A1 | 6/2004 | Weichert et al. | | 2007/0136074 A1 | 6/2007 | Hahn et al. |
| 2004/0138977 A1 | 7/2004 | Tomkins et al. | | 2007/0174171 A1 | 7/2007 | Sheffield |
| 2004/0143530 A1 | 7/2004 | Galai et al. | | 2007/0207849 A1 | 9/2007 | Asher et al. |
| 2004/0153375 A1 | 8/2004 | Mukunya et al. | | 2007/0208642 A1 | 9/2007 | Asher et al. |
| 2004/0171381 A1 | 9/2004 | Inselberg | | 2007/0298871 A1 | 12/2007 | Asher et al. |
| 2004/0192437 A1 | 9/2004 | Amaitis et al. | | 2008/0015969 A1 | 1/2008 | Mowshowitz |
| 2004/0193469 A1 | 9/2004 | Amaitis et al. | | 2008/0026825 A1 | 1/2008 | Yoshioka |
| 2004/0193531 A1 | 9/2004 | Amaitis et al. | | 2008/0032786 A1 | 2/2008 | Hosokawa |
| 2004/0199450 A1 | 10/2004 | Johnston et al. | | 2008/0088087 A1 | 4/2008 | Weitzman et al. |
| 2004/0199459 A1 | 10/2004 | Johnston et al. | | 2008/0183611 A1 | 7/2008 | Frischer |
| 2004/0199471 A1 | 10/2004 | Hardjono | | 2008/0195459 A1 | 8/2008 | Stinski |
| 2004/0204245 A1 | 10/2004 | Amaitis et al. | | 2008/0200242 A1 | 8/2008 | Ginsberg et al. |
| 2004/0210507 A1 | 10/2004 | Asher et al. | | 2008/0207297 A1 | 8/2008 | Zilba |
| 2004/0225554 A1 | 11/2004 | Chiappetta et al. | | 2008/0275824 A1 | 11/2008 | Assia et al. |
| 2004/0229671 A1 | 11/2004 | Stronach et al. | | 2009/0017905 A1 | 1/2009 | Meckenzie et al. |
| 2004/0243504 A1 | 12/2004 | Asher et al. | | 2009/0061995 A1 | 3/2009 | Assia et al. |
| 2004/0260575 A1 | 12/2004 | Massey, Jr. | | 2009/0062016 A1 | 3/2009 | Assia et al. |
| 2004/0267657 A1 | 12/2004 | Hecht | | 2009/0186689 A1 | 7/2009 | Hughes et al. |
| 2005/0010487 A1 | 1/2005 | Weisbach et al. | | 2009/0210335 A1 | 8/2009 | Asher et al. |
| 2005/0021441 A1 | 1/2005 | Flake et al. | | 2009/0247286 A1 | 10/2009 | Inamura |
| 2005/0021445 A1 | 1/2005 | Caro | | 2010/0160012 A1 | 6/2010 | Amaitis et al. |
| 2005/0027583 A1 | 2/2005 | Smit et al. | | 2010/0173697 A1 | 7/2010 | Van Luchene |
| 2005/0027643 A1 | 2/2005 | Amaitis et al. | | 2010/0197382 A1 | 8/2010 | Van Luchene |
| 2005/0038706 A1 | 2/2005 | Yazdani et al. | | | | |

2010/0210335 A1 8/2010 Goto et al.

FOREIGN PATENT DOCUMENTS

| DE | 3539545 | 11/1985 |
|---|---|---|
| EP | 0 739 526 | 10/1995 |
| EP | 1 132 836 | 9/2001 |
| EP | 1 363 430 | 5/2002 |
| GB | 2180675 | 4/1987 |
| GB | 2299425 | 10/1996 |
| GB | 1574447 | 9/2008 |
| JP | 2002049789 | 2/2002 |
| KR | 2001065086 | 7/2001 |
| KR | 2001098204 | 11/2001 |
| KR | 2002042036 | 6/2002 |
| KR | 2004-0062806 | 7/2004 |
| WO | WO 96/41315 | 3/1996 |
| WO | WO 98/58333 | 6/1998 |
| WO | WO 01/16825 | 6/2000 |
| WO | WO 01/98983 | 6/2000 |
| WO | WO 01/39056 | 11/2000 |
| WO | WO 00/79442 A1 | 12/2000 |
| WO | WO 02/12986 | 8/2001 |
| WO | WO 01/77861 | 10/2001 |
| WO | WO 01/77940 | 10/2001 |
| WO | WO 01/77964 A2 | 10/2001 |
| WO | WO 02/46999 | 11/2001 |
| WO | WO 02/25547 | 3/2002 |
| WO | WO 03/010720 | 7/2002 |
| WO | WO 93/10503 | 5/2003 |
| WO | WO 03/100567 | 12/2003 |
| WO | WO 2004/090681 A3 | 10/2004 |
| WO | WO 2005/017700 | 2/2005 |

OTHER PUBLICATIONS

USPTO Notice of Allowance and Fees Due for U.S. Appl. No. 12/823,337, Sep. 20, 2010; (7 pages).
Leslie Eaton, You Too Can Be Rated AAA, N.Y. Times, Jun. 7, 1998.
Leslie M. Fairfax, When You Wish Upon A Star: Explaining The Cautious Growth Of Royalty Backed Securitization, Columbia Business Law Review, 1999.
Thomas S. Gruca, et al., The Effect Of Electronic Markets On Forecasts Of New Product Success, Information Systems Frontiers 5:1, 95-105, 2003 (Kluwer Academic Publishers 2003).
Hakansson, Nils H., et al., "On the Feasibility of Automated Market Making by a Programmed Specialist," The Journal of Finance, vol. 40, No. I, pp. 1-20, dated Mar. 1985.
Howard, Barbara, "The trade: Technology Aims to Take the Final Step," Institutional Investor, vol. XXV, No. 1, p. 15, dated Jan. 1991.
Freund, William C., "Trading Stock Around the Clock: The Future Growth of Global Electronic Markets," California Management Review, vol. 34, No. 1, pp. 87-102, dated 1991.
Lindsey, Richard R., et al., "Specialist vs. Saitori: Market-Making in New York and Tokyo," Financial Analysts Journal, vol. 48, No. 4, pp. 48-57, dated Jul./Aug. 1992.
Chan, K.C., et al., "Market Structure and the Intraday Pattern of Bid-Ask Spreads for NASDAQ Securities," The Journal of Business, vol. 68, No. 1, ISSN: 0021-9398, 12 pages, dated Jan. 1995.
Ye, Jia, An Investigation of Market Fragmentation and the Specialist's Quotation Strategy, Dissertation Abstracts International, vol. 57, No. 3, p. 1260-A, dated Aug. 1995.
Bloomfield, Robert, "The Interdependence of Reporting Discretion and Informational Efficiency in Laboratory Markets," The Accounting Review, vol. 71, No. 4, pp. 493-511, dated Oct. 1996.
Schrage, Michael, '(Firms Quietly Forming Own Economies, San Jose Mercury News, 2 Pages, dated Jul. 13, 2002.
Astral Media, "The Harold Greenberg Fund's Equity Investment Program", 11 pages, dated 1992.
Lewis, Peter H., "Attention Internet Shoppers: E-Cash is Here," The New York Times, Section D, p. 4, col. 4,2 pages, dated Oct. 19, 1994.
Digital Commerce on Increase, Publishing Technology Review, vol. 2, No. 2, ISSN: 1351-0177, 1 page, dated Jan. 1, 1995.
Hansell, Saul, "Today, Shoppers on Internet Get Access to Electronic Cash," The New York Times, Section D, p. 4, col. 5, 2 pages, dated Oct. 23, 1995.
Cones, John W., "43 Ways to Finance Your Feature Film", A Comprehensive Analysis of Film Finance, 14 pages, dated 1995.
Nash, Kim S., "Cybercash at Risk: Money Laws Lacking," Computerworld, 3 pages, dated Dec. 23, 1996.
The Rogue Market Journal, "The Power Play on Popular Culture, A Letter from the Editor", 18 pages, dated Dec. 30, 1996.
Chang, Yahlin, "The Internet: Bull Market in Movies," Newsweek, 1 page, dated Feb. 3, 1997.
Dubin, Alex, "Sunspot: Maryland's Online Community, Taking Stock at the Box Office," 5 pages, dated Aug. 19, 1997.
Engineers, Hollywood Stock Exchange, 2 pages, dated Nov. 13, 1997.
Newman, Jeffrey L., Amex.com, The Street.com, Across the Street: Buying Stock in Hollywood, 2 pages, dated Nov. 17, 1997.
Pedersen-Pietersen, Laura, "The Hollywood Stock Market: You Can't Lose," The New York Times, Section 3, p. 4, col. 1, 3 pages, dated Jan. 11, 1998.
Kelly, Brendan, Variety: Canadians turn to co-finance, pre-sales for TV prod'n coin. Findarticles.com, 4 pages, dated Jan. 19, 1998.
Ragas, Matthew, OnlinePress.com, Insider Trading—Hollywood Style, 3 pages, dated Feb. 4, 1998.
Smith, Leo, Ventura County Business; Venture County Review; Ventura Studio Company Expands on Its Multimedia Savvy; The Los Angeles Times, 2 pages, dated Dec. 15, 1998.
Cones, John W. and Wilke, Pete, "Investor Financing of Independent Film" pp. 1-257, dated 1998.
Tuchlin, Harris E., "Smooth Negotiating: Making the Director Deal," International Entertainment, Multimedia & Intellectual Property Law & Business Network, 13 pages, Dated 1998.
Feuer, Jack, "Disc Driven," Findarticles.com, 8 pages, dated Jul. 12, 1999.
Film Finances, Inc. The World Leader in Completion Guarantees, Internet print-out, 1 page, dated Nov. 23, 2005.
Findarticles.com, "MediaX and CMC International Records Team Up for Exclusive Download Campaigns with Major Artists." PR Newswire, 2 pages, dated Dec. 8, 1999.
Film Finances, Inc. The World Leader in Completion Guarantees. Sample Completion Guaranty; Aug. 2000 Internet printout (14 pages).
Kaufman, Debra, "Lights, Camera, Capital, Online Investing," Wired Magazine, 2 pages, dated 2001.
American Film Market; Hollwoodnet.com; 1997, http://www.hollywoodnet.com/conferences/aft97.htm.
Klapwald, Thea, "Prod'n co. born from Net game", Special Issue: The Independents; Daily Variety, Jul. 24, 1997, 2pp.
Notification of Transmittal of the International Search Report and Written Opinion of the International Searching Authority, or the Declaration for International Application No. PCT/US04/11206, mailed Jun. 5, 2007, 9 pp.
Notification of Transmittal of the International Search Report and Written Opinion of the International Searching Authority for International Application No. PCT/US07/09389, mailed Nov. 13, 2007, 8 pp.
Christine DeMartini et al., "A New and Improved Design for Multi-Object Iterative Auctions", 45 pp, dated Mar. 15, 1999.
In Science, The Real Power of Artificial Markets, pp. 987-988, dated Feb. 9, 2001.
Net Exchange Speaks at Eye for Energy Conference in Amsterdam, Net Exchange provides insight into evolution of energy trading, 2 pp., dated Mar. 28, 2001.
Net Exchange Architects of Markets, Market Architecture: Improving Markets by Enhancing Choice, 9 pp., May 2001.
Net Exchange Addresses Dash Optimization User Group; Net Exchange disuses the application of optimization software to the commerce function of deal-making, 2pp., dated Nov. 7, 2001.
Charles R. Plott et al.; Division of the Humanities and Social Sciences California Institute of Technology; Information Aggregation Mechanisms: Concept, Design and Implementation for a Sales Forecasting Problem, 34 pp., dated Mar. 2002.

Net Exchange Deploys in the Transportation Procurement Market; Net Exchange's advanced combined value trading framework selected for Schneider Logistics' SUMIT CVA procurement system, 2 pp., Jul. 8, 2002.
John O. Ledyard et al., Interfaces; The First uses of a Combined-Value Auction for Transportation Services; vol. 32, No. 5, pp. 4-12, dated Sep./Oct. 2002.
Joyce E. Berg et al., Information Systems Frontiers; Prediction Markets as Decision Support Systems, pp. 79-93, dated 2003.
Hal R. Varian; The New York Times; Can markets be used to help people make nonmarket decisions?, 3 pp., dated May 8, 2003.
Charles Polk et al; The Policy of Analysis Market: An Electronic Commerce Application of a Combinatorial Information Market; ACM 1-58113-679-X/03/0006, Jun. 9-12, 2003.
Net Exchange Expanding the Value of Commerce; The Policy Analysis Market: "Market in Death" or Your Next Decision Support Tool?, 15 pp., Sep. 9, 2003.
Harvard Business School Working Knowledge; You Can Bet on Idea Markets, 4 pp., dated Dec. 1, 2003.
Justin Wolfers et al., Journal of Economic Perspectives; Prediction Markets; vol. 18, No. 2, pp. 107-126, dated 2004.
James Surowiecki; Wired; Smarter Than the CEO; Issue 12.06; 3 pp., dated Jun. 2004.
Barbara Kiviat; Time; The End of Management?; 5 pp., dated Jul. 6, 2004.
James M. Pethokoukis; Money & Business; All seeing all knowing, 2pp., Aug. 22, 2004.
Emile Servan-Schreiber et al.; Electronic Markets; Prediction Markets: Does Money Matter?; 11 pp., dated Sep. 2004.
Common Knowledge Markets; Swing State Presidential Prediction Markets; 2 pp., dated Oct. 6, 2004.
Chris Hibbert; CommerceNet Labs Technical Report 05-02; Zocalo: An Open-Source Platform for Deploying Prediction Markets, 21 pp., dated Feb. 2005.
NewsFutures Prediction Markets; Trading uncertainty for collective wisdom, 3 pp., dated Mar. 15, 2005.
Business Week; The Power of Us, Mass Collaboration on the Internet is shaking up business; 6 pp., dated Jun. 20, 2005.
Corey Hajim; Fortune; Making a Market in (almost) anything; pp. 103-106, dated Aug. 8, 2005.
Prediction Markets Blog by Consensus Point; Popular Prediction market Software Becomes Open Source; 3 pp., dated Aug. 29, 2005.
Bill Saporito; Time; Place Your Bets! on terrorism, on politics, on your future. Why markets will have a say in almost everything; 1 pg., dated Oct. 24, 2005.
Alex Nyberg Stuart; CFO.com; Market Magic, Internal markets can solve thorny allocation problems and predict the future; 3 pp., dated Nov. 1, 2005.
CBS News; The Crowd Knows Best; 2 pp., dated Jan. 8, 2006.
Prediction Markets Blog by Consensus Point; Foresight Technologies Changes Name to 'Consensus Point'; 3 pp., Jan. 30, 2006.
Prediction Mrkt Conference Presentation, 4 pp., dated Feb. 6, 2006.
UsableMarkets—markets, design, usability, research; Public Prediction Markets Heuristic Review: CorwdIQ; 9 pp., May 9, 2006.
Trendio; The founder of Trendio blogs to keep you informed of the latest developments on Trendio, to discuss the future of the site with you and to share some personal reflections, 2pp., dated Oct. 17, 2006.
Robin Hanson et al; Manipulators Increase Information Market Accuracy; pp. 1-11, dated Feb. 2, 2007.
Eric Benderoff; Chicago Tribune; Different Kind of Futures Market; 3 pp., dated Feb. 24, 2007.
Howard Wolinsky; Sun-Times News Group; Prediction market rolls with hunches; 1 pg., dated May 15, 2007.
Motoko Rich; The New York Times; Publisher to Let the Public Have a Vote on Book Projects; 3 pp., dated May 21, 2007.
The Cambridge-MIT Institute; Projects, Innovation Futures UK; 3 pp, dated Mar. 3, 2007.
Ken Miguel; ABC7/KGO-TV/DT; Wisdom of Crowds; ABC7 Futures Market; 2 pp., dated Feb. 15, 2007.
Emile Servan-Schreiber et al.; "Presidential Reality Check," NewsFutures.com Prediction Markets; 6 pp., date unknown.
Incentive Market Prediction Games, Incentive Markets, Inc., 1 pg., dated 2003.
Common Knowledge Markets Overview, 7 pp., date unknown.
Net Exchange Expanding the Value of Commerce; White Papers; 4 pp., dated 2004.
NewsFutures Prediction Markets; Trading Uncertainty for Collective Wisdom, Learn More Selected Books and Articles, 4 pp., dated 2007.
NewsFutures; About the Company, NewsFutures in the News, p. 2, dated 2004.
Inside-Out Markets; Putting market forces to work inside your business, 4 pp., date unknown.
Notification of the International Search Report and Written Opinion of the International Searching Authority for International Application No. PCT/US07/09383, mailed Nov. 7, 2007, 8 pp.
NetExchange Presents at Energy Venture Fair; Net Exchange presents innovative solutions that address challenges faced by the energy industry; 1 pg., dated Jun. 26, 2001.
News Futures Prediction Markets; Trading uncertainty for collective wisdom, 2 pp., dated Dec. 6, 2001.
Robin D. Hanson; IEEE Intelligent Systems, Trends & Controversies, Decision Markets, pp. 16-20, May/Jun. 1999.
Peter Bossaerts et al.; European Economic Review; Inducing Liquidity In Thin Financial Markets Through Combined-Value Trading Mechanisms; pp. 1-25, dated 2002.
Business Week; The Power of Us, Mass Collaboration on the Internet is shaking up business; 6 pp., dated Jun. 20, 2005.
Kilmartin, Liam, et al., Development of an Interactive Voice Response System for a GSM SMS based Share Price Server, DSP UK—Sandown Exhibition Centre, pp. 89-93, dated Dec. 31, 1997.
Friel, Dermot, et al., "An Automated Stock Price Delivery System Based on the GSM Short Message Service," IEEE, pp. 1591-1595 including Figure 3, dated 1998.
Nelson, Darin, et al., (Design Issues in Multimedia Messaging for Next Generation Wireless Systems, pp. 98-103, dated 2001.
Cabral de Souza, Geraldo Marcelo, et al., Proceedings of the IASTED International Conference, Communications, Internet, & Information Technology, "A Gateway to Interconnect Corporate and Mobile Telephony Operator Networks for Two-way SMS Messages Interchange," pp. 449-453, dated Nov. 18, 2002.
Jack D. Glen, "Trading and information systems in two emerging stock market", East Asian Executive Reports, Dec. 15, 1994, vol. 16., Iss 12, pp. 1-4, dated Dec. 15, 1994.
Domowitz, I. et al., "Auctions as algorithms: computerized trade execution and price discovery", Journal of Economic Dynamics and Control, (J-Econ-Dyn-Control-Netherlands), Jan. 1994, vol. 18, No. 1, pp. 29-60.
Notification of Transmittal of the International Search Report and Written Opinion of the International Searching Authority, or the Declaration for International Application No. PCT/US06/28805, mailed Dec. 27, 2006, 6 pp.
Notification of the International Search Report for International Application No. PCT/US99/25793, mailed Aug. 25, 2000, 2 pp.
Preliminary Examination Report for International Application No. PCT/US99/25793, dated May 17, 2001, 4 pp.
Examination Report for European Patent Application No. 99965746.3, mailed Nov. 27, 2007, 7 pp.
Internet Printout: "Who We Are", Wall Street Survivor, http://www.wallstreetsurvivor.com/Public/Content/About.aspx, downloaded Jul. 9, 2009, 2 pp.
Internet Printout: "What is UMOO", UMOO Financial Entertainment, http://www.umoo.com/about_umoo.aspx, downloaded Jul. 9, 2009, 3 pp.
Australian Examiner's Report for Australian Application No. 2006272654, dated Jun. 24, 2009 (3 pp.).
"NTRA All-Star Jockey Championship Special Wagers," dated unknown (3 pp.).
"Wagering Information; Straight or Basic Wagers," Lone Star Park at Grand Prairie: Player's Guide, http://www.1onestarpark.comlbet_info.asp, printed May 8, 2007 (3 pages).
"Wagering Information; Straight or Basic Wagers," NTRA.com, http://www.ntra.com/news.asp?type=playthehorses&id=4799, printed May 8, 2007 (3 pages).
"Glossary of Terms," NTRA.com, http://www.ntra.com/news.asp?type=playthehorses&id=4797, printed May 8, 2007 (3 pages).

"The Basics of Horseplay," NTRA.com, http://www.ntra.com/news.asp?type=playthehorses&id=4795, printed May 8, 2007 (2 pages).

"Bet With the People Who Know Racing," Racing Daily Forum, Jul. 24, 2001 (15 pages).

"Quote of the Day; Bet of the Day," London Times, Jul. 30, 2003 (1 page).

The Patent Office Search Report from International Application No. GB 0320232.2, Dec. 17, 2003 (6 pages).

Scarne "Scarne's New Complete Guide to Gambling," Simon and Schuster, pp. 46-48 plus title and Copyright pp., dated 1961 (2 pages).

PCT Search Report for PCT/US04/09797, May 13, 2005 (9 pages).

Scarne "Scarne's New Complete Guide to Gambling", Simon and Schuster, pp. 132-133, 1974.

Daley, Ken. "Handicapping the Race; Bet on McGwire surging past Maris, Sosa fading at the wire" <URL: http://nl.newsbank.com/nlsearch/we/Archives?p_product=DM&p_theme=dm&p_action=search&p_maxdocs= 200&p_topdoc=1&p_text_direct-0=OED3DAE8C5FC5A3A&p_field_direct-0=documentUd&p_perpage=1O&p_sort=YMD_date:D&s_trackval=GooglePM>, dated Aug. 27, 1998.

The New York Times, Plus: Auto Racing; Winston Cup purse Increased by Nascar, accessed at: http://query.nytimes.com/gst/fullpage.html?res=9F03EOD81139F93AA15752COA9659C8B, published Jan. 29, 2003; (1 page).

The New York Times, Horse Racing; Purse may Rise for Super Derby, accessed at: http://query.nytimes.com/gst/fullpage.html?res=950DE7D81F31F936A15755COA96F948260, published Jun. 25, 1989 (1 page).

PCT Search Report for PCT/US04/10069, Jun. 17, 2005 (9 pages).

Google, Definition of "purse" accessed at: http://www.google.com/search?hl=en&rls=GGLD,GGLD:2004-30,GGLD:en&defl=en&q=..., on May 9, 2008; (2 pages).

rec.gambling.sports faq, Frequently Asked Questions about Sports Betting, Last Modified Feb. 15, 1996, pp. 1-8.

Parimutuel Betting; Wikipedia reference; http://en.wikipedia.org/wiki/Parimutuel_betting; last modified Jan. 26, 2008 (7 pages).

PCT Notification of Transmittal of the International Search Report and the Written Opinion of the International Searching Authority for International Application No. PCT/US04/09796; Jul. 21, 2008 (7 pages).

International Search Report for International Application No. PCT/US04/09798; Sep. 8, 2005 (1 page).

Jon Kiele; "Caveat Emptor: Understanding the Dynamics of the Futures Market"; Electrical World, vol. 210, No. 9, Sep. 1996; pp. 1-5.

"Atlantic International Entertainment, Ltd. (AIEE) Announces Third License Agreement for Internet Casino Extension (ICE) Product with Imperiamedia, Ltd."; PR Newswire; Friday, Jun. 18, 1999; pp. 1 and 2.

Donnelly, Craig, "Philadelphia Park Cancels Races Again as More Workers Join Strike the Bensalem Track's Three Off-Track Betting Sites Are Still Operating. So is Its Television Show", Philadelphia Inquirer, Dec. 30, 1995, p. C5, ProQuest.

"Big Names Raise Stakes in Internet Casinos", Evening Post, Aug. 4, 2001, p. 12.

International Preliminary Report on Patentability for International Application No. PCT/US06/28805, dated Jan. 29, 2008 (4 pages).

Office Action for U.S. Appl. No. 09/465,607, mailed Dec. 20, 2000, 5 pp.

Office Action for U.S. Appl. No. 09/465,607, mailed Sep. 12, 2001, 6 pp.

Office Action for U.S. Appl. No. 09/465,607, mailed Jun. 25, 2002, 6 pp.

Office Action for U.S. Appl. No. 09/465,607, mailed Jan. 14, 2003, 6 pp.

Office Action for U.S. Appl. No. 09/465,607, mailed Jun. 29, 2004, 6 pp.

Office Action for U.S. Appl. No. 09/465,607, mailed Jan. 6, 2009, 14 pp.

Office Action for U.S. Appl. No. 11/379,171, mailed Jan. 29, 2009, 14 pp.

Office Action for U.S. Appl. No. 11/279,997, mailed Jan. 14, 2009, 15 pp.

Examiner Interview Summary for U.S. Appl. No. 11/279,997, mailed Jul. 9, 2009, 2 pp.

Examiner Interview Summary for U.S. Appl. No. 11/279,997, mailed Jun. 22, 2009, 2 pp.

Office Action for U.S. Appl. No. 10/301,527, mailed Oct. 8, 2003, 6 pp.

Office Action for U.S. Appl. No. 10/301,527, mailed Jul. 28, 2004, 6 pp.

Office Action for U.S. Appl. No. 10/301,527, mailed Nov. 23, 2004, 5 pp.

Notice of Allowance for U.S. Appl. No. 10/301,527, mailed Apr. 25, 2005, 10 pp.

Office Action for U.S. Appl. No. 10/655,409, mailed Jan. 27, 2005, 14 pp.

Office Action for U.S. Appl. No. 10/655,409, mailed Aug. 11, 2005, 10 pp.

Office Action for U.S. Appl. No. 10/655,409, mailed Feb. 15, 2006, 17 pp.

Office Action for U.S. Appl. No. 10/655,409, mailed Sep. 7, 2006, 16 pp.

Office Action for U.S. Appl. No. 10/655,409, mailed Sep. 14, 2007, 22 pp.

Office Action for U.S. Appl. No. 10/655,409, mailed Jan. 28, 2009, 22 pp.

Office Action for U.S. Appl. No. 11/351,614, mailed Sep. 19, 2007, 11 pp.

Office Action for U.S. Appl. No. 11/351,614, mailed Oct. 2, 2008, 15 pp.

Office Action for U.S. Appl. No. 09/382,907, mailed Sep. 12, 2000, 11 pp.

Office Action for U.S. Appl. No. 09/382,907, mailed May 29, 2001, 9 pp.

Office Action for U.S. Appl. No. 09/382,907, mailed May 9, 2002, 9 pp.

Office Action for U.S. Appl. No. 09/382,907, mailed Apr. 30, 2003, 8 pp.

Notice of Allowance for U.S. Appl. No. 09/382,907, mailed Nov. 25, 2008, 13 pp.

Office Action for U.S. Appl. No. 11/189,262, mailed Jan. 11, 2008, 23 pp.

Office Action for U.S. Appl. No. 11/189,262, mailed Sep. 30, 2008, 15 pp.

USPTO Office Action for U.S. Appl. No. 11/351,614; Sep. 18, 2009 (12 pages).

USPTO Office Action for U.S. Appl. No. 11/189,262; Aug. 21, 2009 (19 pages).

USPTO Office Action for U.S. Appl. No. 10/667,755; dated Jan. 12, 2009 (19 pages).

USPTO Office Action for U.S. Appl. No. 10/667,755; dated May 14, 2008 (19 pages).

USPTO Office Action for U.S. Appl. No. 10/667,923; dated Aug. 2, 2005 (12 pages).

USPTO Office Action for U.S. Appl. No. 10/667,923; dated Dec. 1, 2006 (17 pages).

USPTO Advisory Action for U.S. Appl. No. 10/667,923; dated Feb. 28, 2007 (3 pages).

USPTO Office Action for U.S. Appl. No. 10/667,923; dated Aug. 31, 2007 (9 pages).

USPTO Office Action for U.S. Appl. No. 10/667,923; dated Jan. 28, 2008 (10 pages).

USPTO Advisory Action for U.S. Appl. No. 10/667,923; dated Apr. 16, 2008 (3 pages).

USPTO Office Action for U.S. Appl. No. 10/667,923; dated May 15, 2008 (11 pages).

USPTO Office Action for U.S. Appl. No. 10/667,923; dated Nov. 4, 2008 (13 pages).

USPTO Examiner Interview Summary Record for U.S. Appl. No. 10/667,923; dated Sep. 15, 2009 (4 pages).

USPTO Examiner Interview Summary Record for U.S. Appl. No. 10/667,755; dated Jul. 20, 2009 (4 pages).

Office Action for U.S. Appl. No. 10/822,484, mailed May 6, 2005, 5 pp.

Office Action for U.S. Appl. No. 10/822,484, mailed Nov. 7, 2005, 16 pp.
Office Action for U.S. Appl. No. 10/822,484, mailed May 31, 2006, 19 pp.
Office Action for U.S. Appl. No. 10/822,484, mailed Dec. 1, 2006, 8 pp.
Office Action for U.S. Appl. No. 10/822,484, mailed Jun. 5, 2007, 15 pp.
Office Action for U.S. Appl. No. 10/822,484, mailed Nov. 20, 2007, 15 pp.
Office Action for U.S. Appl. No. 10/822,484, mailed Jun. 17, 2008, 21 pp.
Advisory Action for U.S. Appl. No. 10/822,484, mailed Aug. 14, 2006, 3 pp.
Examiner Interview Summary for U.S. Appl. No. 10/822,484, mailed Mar. 22, 2007, 3 pp.
Examiner Interview Summary for U.S. Appl. No. 10/822,484, mailed Jul. 10, 2009, 4 pp.
USPTO Notice of Allowance and Examiner Interview Summary Record for U.S. Appl. No. 10/822,484; dated Oct. 1, 2009 (19 pages).
Examiner Interview Summary for U.S. Appl. No. 09/465,607, mailed May 24, 2001 (2 pp.).
Office Action for U.S. Appl. No. 11/379,171, mailed Oct. 6, 2009 (28 pp.).
Advisory Action for U.S. Appl. No. 09/382,907, mailed Sep. 3, 2003 (3 pp.).
USPTO Office Action for U.S. Appl. No. 08/620,906; dated May 15, 1998 (14 pp.).
USPTO Office Action for U.S. Appl. No. 08/620,906; dated Dec. 1, 1998 (9 pp.).
USPTO Office Action for U.S. Appl. No. 08/620,906; dated Jun. 7, 1999 (4 pp.).
USPTO Office Action for U.S. Appl. No. 09/184,571; dated Jun. 23, 2000 (13 pp.).
USPTO Office Action for U.S. Appl. No. 09/184,571; dated Jan. 23, 2001 (6 pp.).
USPTO Office Action for U.S. Appl. No. 09/184,571; dated Apr. 25, 2001 (5 pp.).
USPTO Notice of Allowance for U.S. Appl. No. 09/184,571; dated Nov. 4, 2002 (4 pp.).
U.S. Appl. No. 60/462,176, filed Apr. 11, 2003, in the name of Howard W. Lutnick et al (3 pp.).
USPTO Office Action for U.S. Appl. No. 11/279,997, mailed Nov. 10, 2009 (25 pages).
U.S. Appl. No. 09/660,296, filed Sep. 2000, Keiser et al.
U.S. Appl. No. 10/914,528, filed Aug. 9, 2004, Asher et al.
U.S. Appl. No. 10/914,706, Aug. 9, 2004, Asher et al.
U.S. Appl. No. 12/408,370, Mar. 20, 2009, Asher et al.
U.S. Appl. No. 12/823,337, Jun. 25, 2010, Asher et al.
U.S. Appl. No. 10/914,467, Aug. 9, 2004, Asher et al.
U.S. Appl. No. 11/133,972, May 20, 2005, Asher et al.
USPTO Office Action for U.S. Appl. No. 10/655,409, May 26, 2010 (13 pages).
USPTO Office Action for U.S. Appl. No. 11/189,262, Apr. 1, 2010 (19 pages).
USPTO Pre-Brief Appeal Conference Decision for U.S. Appl. No. 11/279,997, Jun. 3, 2010 (2 pages).
USPTO Pre-Brief Appeal Conference Decision for U.S. Appl. No. 11/379,171, Jun. 7, 2010 (2 pages).
International Preliminary Report on Patentability for International Application No. PCT/US07/09389, dated Oct. 22, 2008 (5 pages).
International Preliminary Report on Patentability for International Application No. PCT/US07/09383, dated Oct. 22, 2008 (6 pages).
International Preliminary Report on Patentability for International Application No. PCT/US04/09798, dated Oct. 1, 2005 (4 pages).
International Preliminary Report on Patentability for International Application No. PCT/US04/09796, dated Apr. 28, 2009 (4 pages).
USPTO Office Action for U.S. Appl. No. 09/660,296, Aug. 27, 2003 (10 pages).
USPTO Office Action for U.S. Appl. No. 09/660,296, May 18, 2004 (14 pages).
USPTO Advisory Action for U.S. Appl. No. 09/660,296, Oct. 6, 2004 (3 pages).
USPTO Office Action for U.S. Appl. No. 09/660,296, Dec. 30, 2004 (31 pages).
USPTO Office Action for U.S. Appl. No. 09/660,296, Jun. 28, 2005 (25 pages).
USPTO Office Action for U.S. Appl. No. 09/660,296, Jan. 30, 2006 (16 pages).
"A New Craze for March's Maddest: Online 'Trading' of NCAA Shares", Barbara Martinez, The New York Times Company: Abstracts, Mar. 8, 1994 (1 page).
Film Finances, Inc. The World Leader in Completion Guarantees. Oct. 1999 Internet print-out (1 page).
Mukta Arts Limited; the Internet print-out; 1999 (20 pages).
"Film Venture; Funding the Next Generation of Filmmakers," Film Investors Group, (5 pgs) undated.
Lee, "Sport Marketing Strategies Through the Analysis of Sport Consumer Behavior and Factors 2000 Influencing Attendance," UMI Dissertation Services, (139 pgs) 2000.
Eng, "Producing New Opportunities," Presstime, (2 pgs) Feb. 2005.
Notification of Transmittal of the International Search Report and Written Opinion of the International Searching Authority, or the Declaration for International Application No. PCT/US2005/01276 (9 pgs), Dec. 18, 2006.
Notification of Transmittal of the International Search Report and Written Opinion of the International Searching Authority, or the Declaration for International Application No. PCT/US2006/19316 (6 pgs), Jan. 8, 2007.
Goliath Business Knowledge on Demand; Innkeepers USA Trust Announces 2001 Dividend Allocation; (1 pg) Jan. 24, 2002.
USPTO Office Action for U.S. Appl. No. 10/914,706, Feb. 21, 2008 (19 pgs).
USPTO Office Action for U.S. Appl. No. 10/914,467, Mar. 19, 2008 (25 pgs).
USPTO Office Action for U.S. Appl. No. 11/133,972, Mar. 31, 2008 (18 pgs).
USPTO Office Action for U.S. Appl. No. 10/914,528, Feb. 20, 2008 (13 pgs).
USPTO Office Action for U.S. Appl. No. 10/914,528, Apr. 20, 2009 (11 pgs).
USPTO Office Action for U.S. Appl. No. 10/914,467, Dec. 15, 2008 (14 pgs).
USPTO Office Action for U.S. Appl. No. 11/133,972, Dec. 23, 2008 (20 pgs).
US PTO Office Action for U.S. Appl. No. 12/408,370; 11 pages; Aug. 6, 2009.
USPTO Office Action for U.S. Appl. No. 10/914,706, Feb. 21, 2008 (19 pgs).
Notice of Allowance for U.S. Appl. No. 10/914,528; 38 pages; Dec. 11, 2009.
Gaylord Entertainment, Warner Brothers pictures enters in to Co-Financing/production Pact, Sep. 14, 2000; Business Wire; Gaylord.
CINE-TEC Motion Picture Funding and Marketing Consultants, http://cine-tec.com/whatwedo.htm,2000 (CINE-TEC).
Notice of Allowance for U.S. Appl. No. 10/914,467; 38 pages; Jan. 28, 2010.
Notice of Allowance for U.S. Appl. No. 11/133,972; 22 pages; Nov. 25, 2009.
Michael C. McCabe; You have now entered the Bowie Bond Era; 1997 p. 8-16; www.freddiemac.com/finance/smm/july97/pdfs/mccabe.pdf (McCabe).
USPTO Office Action for U.S. Appl. No. 10/914,706, Feb. 21, 2008 (12 pages).
USPTO Office Action for U.S. Appl. No. 10/914,706, Nov. 4, 2008 (8 pages).
USPTO Notice of Allowance and Fees Due for U.S. Appl. No. 10/914,706, Mar. 5, 2009 (7 pages).
USPTO Notice of Allowance and Fees Due for U.S. Appl. No. 10/914,706, Apr. 16, 2009 (2 pages).
USPTO Notice of Allowance and Fees Due for U.S. Appl. No. 10/914,706, May 12, 2009 (3 pages).
USPTO Notice of Allowance and Fees Due for U.S. Appl. No. 10/914,706, Jun. 11, 2009 (2 pages).
USPTO Notice of Allowance and Fees Due for U.S. Appl. No. 10/914,706, Jul. 2, 2009 (2 pages).

Canadian Exam Report for Application No. 2533524, dated Jun. 7, 2010 (4 pages).
USPTO Notice of Allowance and Fees Due for U.S. Appl. No. 12/408,370, Mar. 30, 2010 (7 pages).
C. Edward Fee, The Costs of Outside Equity Control; Evidence from Motion Picture Financing Decisions, The Journal of Business, vol. 75, No. 4 (Oct. 2002), pp. 681-711 (Costs).
EP Examination and Search Report for Application No. 05705731.7 dated Dec. 18, 2008; 4 pages.
AU Examiners Report for Application No. 2005208563 dated Nov. 25, 2009; 3 pages.
AU Notice of Acceptance for Application No. 2005208563 dated Feb. 7, 2010; 3 pages.
Office Action for U.S. Appl. No. 11/279,997, mailed Aug. 10, 2010, 23 pp.
Avary's Domain—Interviews—Millimeter Magazine Interview, pp. 9-10, dated Mar. 3, 1994.
U.S. Appl. No. 10/667,775, filed Sep. 22, 2003; 34 pages.
U.S. Appl. No. 10/667,923, filed Sep. 22, 2003; 43 pages.
U.S. Appl. No. 09/660,926, filed Sep. 13, 2000; 38 pages.
U.S. Appl. No. 10/914,528, filed Aug. 9, 2004; 35 pages.
U.S. Appl. No. 10/914,706, filed Aug. 9, 2004; 33 pages.
U.S. Appl. No. 12/408,370, filed Mar. 20, 2009; 33 pages.
U.S. Appl. No. 12/823,337, filed Jun. 25, 2010; 33 pages.
U.S. Appl. No. 10/914,467, filed Aug. 9, 2004; 31 pages.
U.S. Appl. No. 11/133,972, filed May 20, 2005; 36 pages.
Pre-Brief Appeal Conference Decision for U.S. Appl. No. 11/133,972; 2 pages; Apr. 30, 2009.
U.S. Appl. No. 12/709,067, filed Feb. 19, 2010; 27 pages.
U.S. Appl. No. 12/709,047, filed Feb. 19, 2010; 44 pages.
U.S. Appl. No. 12/705,059, filed Feb. 12, 2010; 29 pages.
U.S. Appl. No. 09/465,607, filed Dec. 17, 1999; 22 pages.
U.S. Appl. No. 10/655,409, filed Sep. 4, 2003; 20 pages.
U.S. Appl. No. 11/351,614, filed Feb. 9, 2006; 30 pages.
U.S. Appl. No. 11/189,262, filed Aug. 25, 2005; 73 pages.
U.S. Appl. No. 11/279,997, filed Apr. 17, 2006; 65 pages.
U.S. Appl. No. 11/379,171, filed Apr. 18, 2006; 61 pages.
U.S. Appl. No. 08/620,906, filed Mar. 25, 1996; 31 pages.
U.S. Appl. No. 09/184,571, filed Nov. 2, 1998; 44 pages.
U.S. Appl. No. 10/301,527, filed Nov. 21, 2002; 44 pages.
U.S. Appl. No. 09/382,907, filed Aug. 25, 1999; 26 pages.
U.S. Appl. No. 10/822,484, filed Apr. 12, 2004; 26 pages.
Advisory Action for U.S. Appl. No. 10/655,409, mailed Nov. 17, 2005, 3 pp.
Pre-Brief Appeal Conference decision for U.S. Appl. No. 11/351,614; Jul. 7, 2009 (3 pages).
Examiner's Answer to Appeal Brief for U.S. Appl. No. 09/382,907, mailed Jul. 2, 2004, 17 pp.
U.S. Appl. No. 09/660,296 filed Sep. 13, 2000; 42 pages.
Pre-Brief Conference Decision for U.S. Appl. No. 11/189,262, mailed Feb. 26, 2010, 2 pp.
Office Action for U.S. Appl. No. 10/822,484, mailed Dec. 13, 2004, 5 pp.
Pre-Brief Appeal Conference Decision for U.S. Appl. No. 10/822,484, mailed Jan. 16, 2009, 2 pp.
Notice of Allowance for U.S. Appl. No. 10/822,484, mailed Oct. 1, 2009, 18 pp.
Notice of Allowance for U.S. Appl. No. 11/133,972; 2 pages; Mar. 1, 2010.
Pre-Brief Appeal Conference Decision for U.S. Appl. No. 11/279,997, mailed Jun. 3, 2010, 2 pp.
USPTO Examiner Interview Summary Record for U.S. Appl. No. 10/667,755; dated Nov. 9, 2009 (3 pages).
Notice of Allowance for U.S. Appl. No. 10/914,528; 3 pages; Mar. 1, 2010.
Office Action for U.S. Appl. No. 10/914,528; 7 pages; Jan. 23, 2010.
Notice of Allowance for U.S. Appl. No. 10/914,467, Feb. 26, 2010 (3 pgs).
Pre-Brief Appeal Conference Decision for U.S. Appl. No. 10/914,467, May 29, 2009 (2 pgs).
Office Action for U.S. Appl. No. 10/914,467, Feb. 1, 2008 (6 pgs).
Advisory Action for U.S. Appl. No. 10/914,467, Mar. 3, 2009 (2 pgs).
Definition of dividend from www.wikipedia.org, revision as of Aug. 13, 2010 (obtained Dec. 21, 2010 at: http://en.wikipedia.org/w/index.php?title=Dividend&oldid=378636953) (7 pages).
Notice of Allowance for U.S. Appl. No. 12/823,337, 9 pages; Sep. 20, 2010.
US PTO Office Action for U.S. Appl. No. 11/189,262; Nov. 23, 2010;20 pages.
USPTO Advisory Action for U.S. Appl. No. 10/655,409 dated Sep. 30, 2010; 3 pages.
USPTO Office Action for U.S. Appl. No. 11/351,614; Nov. 12, 2010; 24 pages.
AU Examination Report for Application No. 2007201720; 2 pages; Nov. 17, 2010.
USPTO Office Action for U.S. Appl. No. 10/655,409 dated Dec. 13, 2010; 13 pages.
USPTO Office Action for U.S. Appl. No. 09/465,607; 32 pages; Dec. 16, 2010.
USPTO Office Action for U.S. Appl. No. 11/279,997; mailed Nov. 9, 2010 (22 pages).
USPTO Office Action for U.S. Appl. No. 11/379,171; Sep. 27, 2010; 16 pages.
USPTO Office Action for U.S. Appl. No. 12/709,067; Dec. 27, 2010; 23 pages.

* cited by examiner

EXCHANGE OF ENTRIES CORRESPONDING TO PARTICIPANTS IN A SPORTS COMPETITION

CROSS REFERENCE TO RELATED APPLICATION

This patent application is a continuation application of U.S. patent application Ser. No. 10/822,484, filed Apr. 12, 2004 now U.S. Pat. No. 7,641,549, which is hereby incorporated by reference herein in its entirety, and which is related to and claims the benefit of U.S. Provisional Application No. 60/462,176 filed Apr. 11, 2003.

TECHNICAL FIELD

This patent application relates in general to an exchange of entries corresponding to participants in a sports competition.

BACKGROUND OF THE INVENTION

Exchange systems exist for trading assets. A known system provides a platform for trading shares of stock in various companies. The platform enables purchasers and sellers of the assets to make and accept offers to sell and/or offers to buy the assets from one another. The system then facilitates the transaction between the buyer and the seller. The NASDAQ is an example of such a system.

In a typical auction, such as an automobile auction, for example, an item is made available for bidding. Various participants place bids for the item. Typically, there will be a starting bid proposed by an auctioneer. The starting bid may be a minimum acceptable bid. One participant may place the starting bid. Other participants may place subsequent bids, each subsequent bid being higher than the previous bid. At the end of the bidding period, or if there is a point at which no participants wish to make a higher bid than the present bid, the highest bidder purchases the item for the bid price.

Many states have lottery systems, by which participants purchase entries in the lottery. The money paid for the entries is pooled and a portion of the pooled money is paid to winners based on fixed odds or based on the number of winners in a pooled game. The winner may be determined by matching randomly drawn numbers to a series of numbers on lottery tickets given to the participants in exchange for the entry purchase price.

Tournaments are among the various sports competitions. The NCAA basketball tournament, for example, is held from mid-March to early-April each year. It involves sixty-four teams in an elimination style format and is among the most widely bet sporting events in the United States. Many thousands of people bet on the tournament in some form or another. One of the most popular forms of betting is in a "bracketed pool" where, prior to the beginning of the tournament, individuals attempt to select the winners of each game played throughout the tournament and points are awarded depending on the stage of the tournament (i.e. more points are awarded for later games in the tournament than earlier games). All of the participants pay a single entry fee (i.e. $5, $10 or even $100) and fill out a tournament grid. The NCAA tournament bracket is published in newspapers nationwide and on the Internet and numerous pools are created in offices and among friends.

SUMMARY OF THE INVENTION

Among other things, the present invention provides an exchange system and method according to which interests in entries in an activity may be transferred between users. The entries, or interests therein, may be first distributed, for example, according to a lottery or an auction.

In one embodiment, a method includes distributing a first set of entries in at least one activity and conducting after market trading of at least one of the entries between at least one buyer and at least one seller. The after market trading may include receiving, from a first user, at least one buy request associated with at least one entry of the first set of entries. At least one sell request associated with the at least one entry of the first set of entries may be received from a second user. The at least one buy request may be matched with the at least one sell request. The at least one entry of the first set of entries may be transferred from the second user to the first user. In another embodiment, the after market trading may include conducting a short sale of the at least one entry.

In another embodiment, an exchange system is provided for conducting the exchange of an interest in at least one entry in an activity. The system includes a processor operable to transfer the interest from a first user to a second user.

Various embodiments of the present invention may benefit from numerous advantages. It should be noted that one or more embodiments may benefit from some, none, or all of the advantages discussed below. One advantage is the ability to transfer interests in entries in an activity between users in a market exchange environment. Another advantage is to enable an electronic trading platform for the exchange of entries (or interests therein) in activities. Another advantage is that entries may be distributed by way of a lottery or an auction and then traded in a after market, where the market value of each entry may vary from the initial price paid for the entry. Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF EXAMPLE EMBODIMENTS OF THE INVENTION

Figure 1:
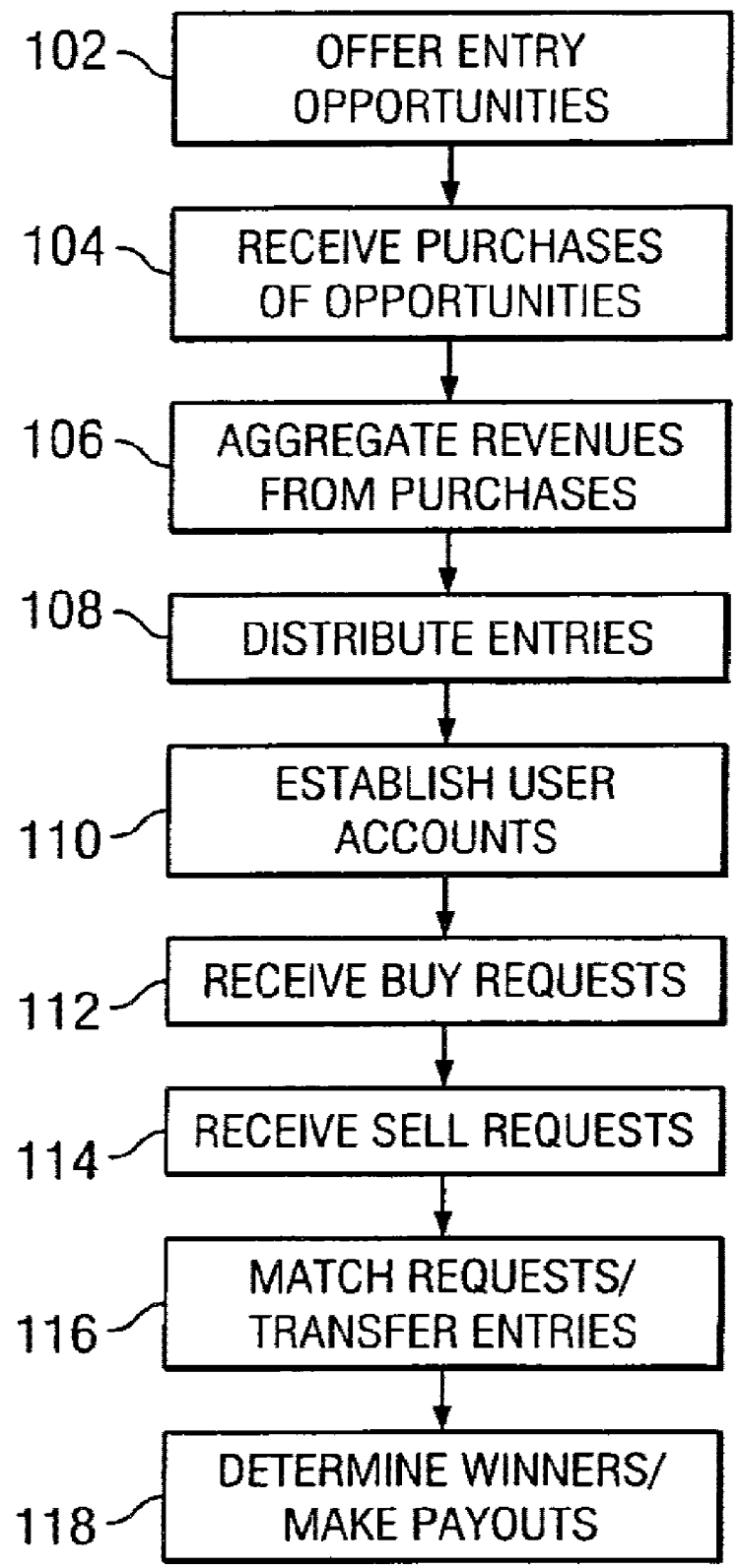
FIG. 1 illustrates a method for distributing and exchanging entries in an activity in accordance with an embodiment of the present invention.

In various embodiments, a method of distributing, managing, and exchange entries in one or more activities is provided. The entries may be distributed by any suitable process including, without limitation an auction or lottery process. The distributed entries may be exchanged in a market environment. The exchange may operate on an electronic platform. Revenues may be collected from distributions and/or exchanges of entries. A portion of the revenues may be paid to one or more users who hold one or more particular winning entries determined by any number of parameters and at the occurrence of any number of events.

In accordance with example embodiments of the invention, methods and systems are provided for distributing and exchanging entries in one or more activities. By way of example only, the following description will refer to entries as being the teams in a sixty-four-team NCAA basketball tournament, and the activity as being the tournament itself. The systems and methods described herein also determine winning entries. By way of example only, the description will discuss a winning entry as being the team that wins the NCAA basketball tournament.

These are examples only. The scope of the invention is intended to cover any suitable activities, entries, winning entries, events, parameters, etc. Activities may include, without limitation, any activity for which one or more winning entry may be determined. For example, activities may include sporting competitions, entertainment competitions, political elections, financial market performance, and the like. Entries may include teams, individuals, events, or any other designation for which one or more winning entries may be determined based on the outcome of the activity or the occurrence of an event associated with an activity. Parameters may include any parameter, event, condition, or the like that may impact the activity, the entry, or the distribution or exchange of entries. Parameters may be associated with users, entries, activities, or the exchange system, for example. Events may include any event for which a determination is made to take an action. The event may be the occurrence of an event within an activity, the end of an activity, a time, or the occurrence of a value associated with a parameter, for example. Actions include any actions required for the operation of the various described systems and methods. Actions may include, for example, distribution of entries, receipt or communication of buy and sell requests by users, matching of buy and sell requests, exchange of entries, payment and receipt of funds for the exchange of entries or any other service provided by the exchange systems and methods, determination and communication of exchange data and information, and payouts for winning entries.

For entries to be exchanged, at least one entry must be distributed. In accordance with various embodiments, entries may be distributed by a suitable method. For example, entries may be distributed according to a lottery, an auction, a sale, or any other similar process. Preferably, entries are distributed to users who may later participate in exchanging entries with one another, or with other users who did not receive entries during the distribution. A user may be an individual, a consortium, a company, a trust, a computer, or any other entity that may be associated with an entry.

By way of example only, FIG. 1 illustrates a lottery method of distributing entries for an NCAA basketball tournament. The order of the steps is not necessarily required. In a first step 102, entry opportunities are offered to users. The users may be known, pre-selected offerees, or users among a general market. In step 104, the users collectively purchase sixty-four entry opportunities by paying a single entry fee for each entry opportunity. In this example, the number of entry opportunities equals the number of tournament entries, but this is not required. In step 106, the entry fees are aggregated in a pool. In this example, the entry opportunity fee is $100. Therefore, $6,400 will be aggregated in the pool. All or a portion of this $6,400 may be paid to a single or multiple winners. In step 108, preferably prior to the start of the tournament, each user is randomly assigned one of the sixty-four teams for each entry opportunity purchased. It is preferable, though not required, that all of the available entry opportunities are purchased and that each of the entries (e.g., the teams in the tournament) are associated with a user.

Obviously, some teams will have a better chance to win the tournament and, therefore, will have a higher value than others. All teams are immediately able to be bought and sold, either to other users already participating in the pool or to others not participating, for whatever price the market will bear (considering that the owner(s) of the winning team(s) will win all or a portion of $6,400). A strong team such as Duke or Kansas might command a price of $2,000 or more, while a weak team might command a price of only $5 or $10. In one embodiment, entries may be bought and sold at any time throughout the tournament, right up to the final minute of the final game. Alternatively, exchange of entries might be limited to a certain time period, the beginning and end of which may be determined according to any criteria. The current buy and sell prices are preferably listed or displayed in connection with an exchange, described in greater detail below.

In step 110, at least a first user establishes an account. Preferably, multiple users establish accounts. The accounts are established for a number of purposes, including associating a user identity with each entry to designate which owners own which entries. The accounts may also be used to conduct payment transactions. Accounts may be established according to any suitable process. In one embodiment, a user requests that an account be established for a certain amount of money. The user may immediately fund the account by way of, for example, an electronic debit of the user's checking account, or by use of a credit card. Optionally, accounts may be established base on credit extended to the user. In the case of an extension of credit, the applicant user's creditworthiness is preferably checked to meet certain criteria prior to the establishment of the account.

In step 112, a first user places a buy request. The buy request may include, for example, the identification of an entry and the requested purchase price. In step 114, a second user places a sell request. The sell request may include, for example, the identification of an entry and the requested sell price. Users may submit single or multiple buy and sell requests at a given time. Alternatively, the system may be configured to require that each buy or sell request be made separately.

In addition to buying or selling an entry, users may make a request to sell short (and/or buy long). For instance, a user may request to sell short an entry they do not own any time they think it is overpriced. If a user completes a short sale, then the user is appropriately associated with the entry being sold short and at the determining event (e.g., at the end of the tournament) a determination is made whether the user owes money or is due money in addition to a payout from the pool. For example, assuming a user sees that Oklahoma is trading at $2,000, the user might consider that entry to be overpriced. In other words, given the user's assessment of the chances that Oklahoma will win the tournament, the user believes that $2,000 is too much to pay for an Oklahoma entry. The user may attempt to sell Oklahoma short at $2,000 (even though the user does not own the Oklahoma entry). Another user may purchase Oklahoma at $2,000 (the actual market price). Then the short seller must cover his short position at a future time, when he hopes the price for Oklahoma will have fallen. For example, if at the time he covers his short position, the price of Oklahoma is $1,800, then he will have profited $200.

In the event of a short-sale, the short-seller preferably posts a margin commensurate with the imputed risk. Margin requirements are based, at least in part, on the total possible loss (i.e. 60% of the total pool where second and third place finishers are paid; 100% of the total pool where only the winner is paid), and can be weighted to reflect event-specific details (such as the perceived odds of winning and, therefore, risk of loss to the house or other entity providing the team for short-sale). Since the short seller is responsible for paying any resulting winnings attributable to that team (akin to a stock short-seller being responsible for dividends), margin requirements can also reflect the fact that in multiple-team payoff pools (i.e. second-fourth place teams are paid), there is an added risk of loss than in a single-team (all to winner) payoff pool.

The pool can be structured such that a participant buys all sixty-four teams in the tournament (or some lesser amount) and then sells the teams he does not wish to keep, thereby reducing the cost of his purchase. A participant then has the option of buying from the house at the start of the tournament or buying preferred teams on the trading exchange (or directly from an owner where permitted), a choice that can be made after consideration of, among other things, the perceived value of the preferred teams and non-preferred teams and their current trading prices.

In step 116, buy requests are matched with sell requests. Matching can be accomplished by any suitable method. In one embodiment the match only occurs if the buy request entry matches a sell request entry and the associated buy price equals the associated sell price. The buy and sell prices do not, however, have to be equal in all embodiments, and matches may be made according to certain predetermined considerations even if the buy and sell prices are not equal. This is described in greater detail below. However, one example would be where a match occurs if the buy and sell prices differ by less than a certain amount. In such a case a transaction (or exchange) may be made at the buy price, the sell price, or at another price (such as half way between the buy and sell prices, for example). This may be useful, for instance, if a seller would prefer to get a certain price for his entry but would accept a lesser amount, and a corresponding buyer would prefer to buy an entry for a certain amount (which is less than the sell price). but would agree to buy the entry for an amount greater than the buy request price.

Further, in accordance with another embodiment, a buyer need not specify an entry, but rather may specify only a buy request price. In such a case, a match may occur so long as there is any entry available at the buy price (or some other acceptable price. These are examples only, and it can be appreciated that numerous scenarios may exist where buyers and sellers are matched to result in an exchange of one or more entries at specific or determined prices. The present invention encompasses all exchange scenarios that may occur in connection with the exchange of other assets, such as the trading of stocks on the NASDAQ.

As discussed, the value of entries being managed by the exchange systems and methods described herein may change according to the dictates of the market. The market may dictate, according to any number of factors, what is an acceptable buy or sell request price. It is envisioned that as an activity (such as a basketball tournament) progresses, the market price for entries will change. Preferably, entries that have been eliminated from the tournament receive a designation of a zero value immediately upon elimination. The market value of the other entries will increase or decrease based upon their performance at various stages of the activity (e.g., in each game of the tournament) and other factors such as injuries, weather, changes in venue, and other factors which may effect the performance of an entry in the activity. Market value may also be affected by indirect factors that are unrelated to entry performance, such as trends in popularity.

At step 118, the tournament concludes, and the holder of the winning entry receives a payout. The payout can be determined according to any suitable method. For example, the payout can be all or a portion of the pool of entry fees. The payout can be some other fixed amount. The payout can be an amount from which is deducted a commission or takeout. A takeout might be deducted, for example, by a host which operates the exchange. The takeout or commission can be determined according to any suitable method. For instance, the takeout might be determined as a percentage of the initial pool of entry fees (say 10%) or on the basis of a fee per exchange, or per dollar amount of exchanges (e.g., 2% of each trade).

In order to facilitate bids, lottery purchases, and exchanges, a host of the exchange could establish a minimum guaranteed prize amount. For example, the host of the pool could guarantee that the minimum prize to the winner would be $1,000, and then bidding on the various teams would reflect that the successful bidder for one of those teams stood to win that amount of prize money (e.g., a strong tournament favorite might command a bid in excess of $500 if the winning bidder was guaranteed $1,000 if the team won the tournament, which, in turn, could be expected to generate additional bidding on other teams by those who did not expect the favorite to win).

It should be recognized that there may be more than one "winning" entry. For example, payouts may be made to the first, second, and third-place entry teams in a tournament. Similarly, there may be more than one time or event at which a payout is determined for a given entry. For example, a single entry may "win" at the end of each stage in a tournament or at the end of each quarter in a football game.

There may also be numerous pools for each activity. With respect to an NCAA tournament, for example, there may be many distributions of the same entries. This is preferable such that entries (e.g., basketball teams) will be traded regularly and no one team is unavailable. One person may own the same team in multiple pools, or may own different teams in the same pool. There may be multiple instances of the same activity for which the entry opportunity price varies. For example, there may be a $5 pool, $10 pool, $20 pool, $50, $100 pool, and $500 pool for one tournament. Various prizes and/or money may be awarded in varying prize formats. For instance, some pools may only pay money to the winner, while other pools may pay the owners of the top two, three or four teams (the final four), with the winning team receiving more than the second, which receives more than the third, etc. (e.g., of a $6,400 pool, 60% goes to the winner, 20% to second, 12% to third and 8% to fourth). Prizes do not have to be cash, but can be anything that has a value, such as memorabilia, merchandise, points, airline miles, services, etc. Players may choose to participate in pools according to their risk tolerance and desire to be paid in the event their team finishes among the final four, rather than only if it wins. They will decide to participate in the after-market in the various pools based on the above, along with the going price for the team(s) they desire.

Moreover, distribution and exchange of entries in multiple, differing types of activities may occur. For example, a single exchange system or method may incorporate a basketball tournament, a reality television contest, a political race, and two football games.

In at least one embodiment, the exchange method incorporates odds. For example, an entry may have associated odds at the time of the initial distribution. In such a case, for instance, one entry may pay a certain amount if it wins and the entry with odds might pay 2-1, or double the amount of the other entry. Odds may also be attached to entries being exchanged. The odds may be provided by the exchange or the user. Likewise, the risk associated with providing odds may be the responsibility of the exchange or the user.

According to another embodiment, another type of initial distribution is the auction approach. This may be used as a substitute for the lottery approach, as an addition to the lottery approach, or as a substitute for/addition to any other distribution approach. According to the auction approach, entries are auctioned off to the highest bidder prior (or according to any other criteria), preferably prior to the start of the activity. The amount someone is willing to pay for an entry is reflective of his view of that entry's chances of winning, in addition to the total value of the potential payout. After the closing of the auction, users may buy and sell entries as already described above.

According to one embodiment, the distribution techniques may be incorporated into the after-market exchange trading. For example, once entries have been initially distributed, a user may make his entry available to the highest bidder from the market. The selling user might require a minimum bid, and any other auction techniques may be used.

The exchange activities may be hosted in any number of formats. For example, the exchange may be embodied in an electronic exchange system via the Internet or on a closed-loop system. An electronic exchange may list all of the pools, showing each of the entries and their current prices, as well as other pertinent information. Links to websites with tournament statistics, injury reports and other relevant matters can be provided. Users can input their initial entry or trades through a standard personal computer or other similar device. Alternatively, and where it is illegal to offer sports betting over Internet, the exchange can be hosted in a casino sportsbook or other legalized gambling establishment, either in a "trading pit" or by registering bids and offers with a teller or through a self-service betting terminal. Such a self-service betting terminal can be provided throughout a facility, including in casino hotel rooms through the television (in a manner similar to check out services currently provided, where the remote control device or a computer keyboard is utilized). The current prices and other information could be displayed on closed-circuit television monitors, information boards, or other appropriate displays. Hosting can also enable remote, wireless participation through the use of a cellular network or a virtual private network.

Figure 2:
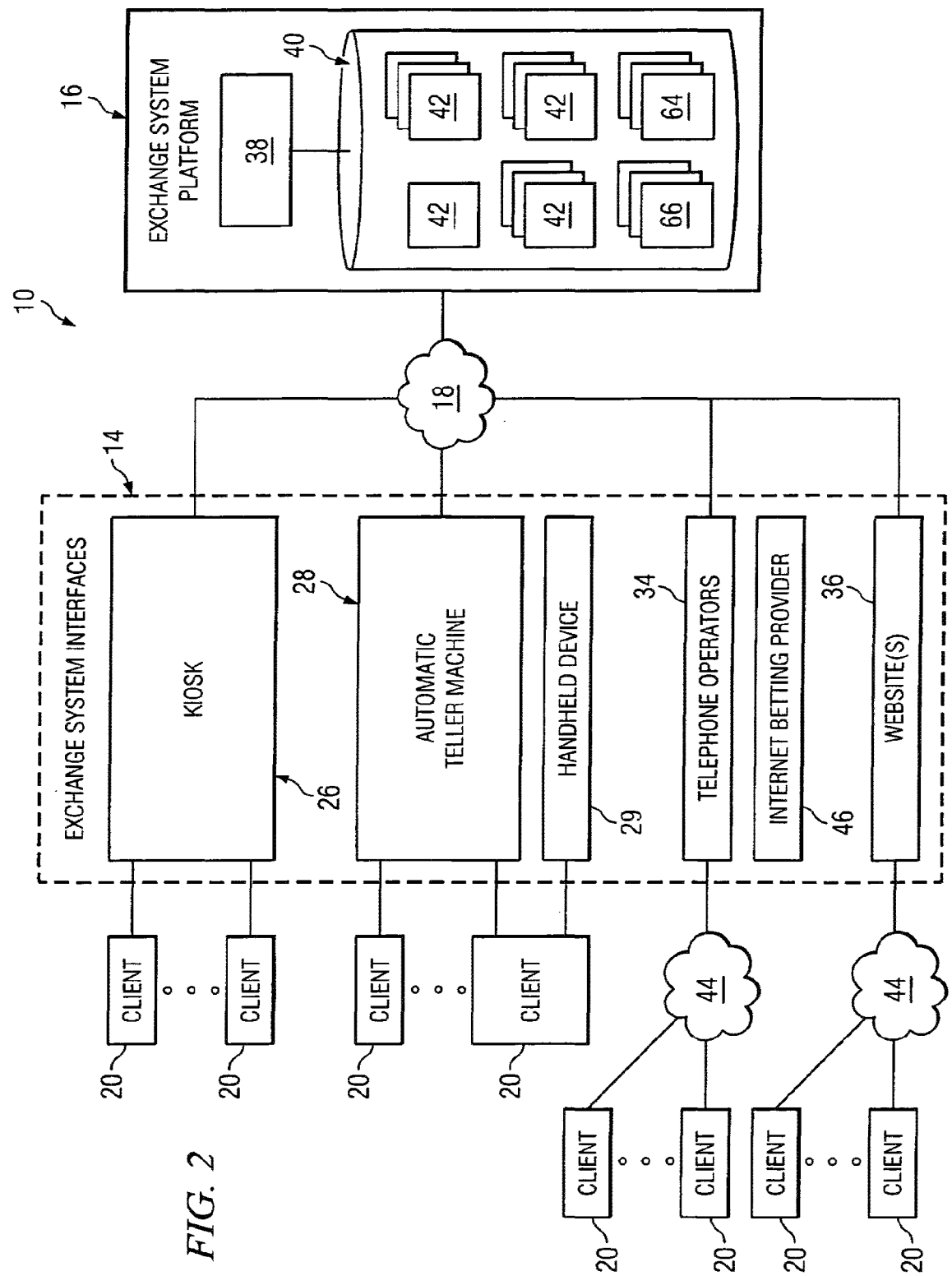
FIG. 2 illustrates a system for distributing and exchanging entries in an activity in accordance with an embodiment of the present invention.

According to another example embodiment, as shown in FIG. 2, a system 10 for distributing and/or exchanging interests in contest entries is provided. System 10 includes one or more exchange system interfaces 14 and an exchange system platform 16 coupled by one or more communication networks 18. In general, one or more clients 20 may receive exchange information (such as entry information, entry pricing, sale/purchase offer information, market trends, etc.) via exchange system interfaces 14. Exchange system interfaces 14 communicate information received from clients 20 to exchange system platform 16. Exchange system platform 16 stores information from clients 20 and determines actions to be taken based on such information. Such actions may include, for example, displaying a buy/sale offer price, a number of entries for sale, executing a transaction of one or more entries between one or more clients for a certain price, etc. Exchange platform 16 then communicates appropriate information about transactions to one or more of the exchange system interfaces 14.

System 10 can manage transactions concerning entries in any suitable activity. Activities may include, for example, competitions. Competitions may include, for example, tournaments, such as basketball, bowling, soccer, cricket, tennis and golf tournaments. Competitions may also include races such as horse races, dog races, auto races, etc. Competitions may also include single game competitions such as baseball, basketball, football, hockey, soccer, etc. Competitions may also include non-sports competitions. Examples of non-sports competitions may include, for instance, entertainment competitions, such as the Oscars, Grammys, Emmys, box office rankings, or reality television competitions (e.g., Survivor or American Idol). Non-sports competitions may also include other competitions such as political elections. The activities handled by system 10 can also include other suitable activities that are not competitions per se. Any activity that has multiple entrants may be managed by system 10.

System 10 may function as an exchange for entries, such as entries in a tournament. In such a case, the winning entry would be determined at the end of the activity (in this case, the tournament). Alternatively, system 10 may serve as an exchange for events, which may be based upon a given time or some other criterion. For example, in a single game competition, such as a football game, the entries might include a single digit. The exchange would manage transactions of the single digit. The "winning" single digit might be determined based on the last number in the total score of the two football teams at the end of each quarter. Thus, the term "entries" as used herein, does not necessarily imply "participants" or teams in a competition. Rather, an entry is any designation that may be determined at any point in, or based on any criterion in, an activity. Likewise, a winning entry does not necessarily mean the winner of a particular competition. Rather, a winning entry may be determined based on any criterion, such as a predetermined number, predetermined time, or the occurrence of an event.

In an example embodiment, system 10 may be configured to handle the initial distribution of the entries. This may be accomplished according to the lottery and/or auction methods already discussed, or according to any other suitable method. Once entries for the activity have been initially distributed, the system 10 manages the exchange of the entries. For example, in a basketball tournament, the entries may be the respective participating teams. The winning entry may be the team that wins the entire tournament. System 10 allows users, through clients 20, to conduct transactions involving the exchange of entries before or during the tournament. Each entry will have an associated price. Preferably, the price is determined by the market. However, the price may be determined based on any factor or set of factors. The price may also be artificially set. System 10 may be configured to receive, from a first user, an offer to sell an entry at a first price. System 10 may be similarly operable to receive, from a second user, an offer to buy an entry at a second price. The first and second prices may have any relationship including one being less than, equal to, or greater than the other. For example, the first price (sell price) might be $100. The second price (buy price) might be $90. System 10 may match a buy price and a sell price with each other to initiate an exchange based on any suitable criterion. For instance if the buy price and sell price are within a certain range of one another, system 10 may initiate an exchange at the buy price, at the sell price, or at some other price determined according to any suitable method. For example, if system 10 might be configured to initiate an exchange of the entry at a price half way between the buy and sell price (i.e., $95). The range between the buy and sell prices at which system 10 will initiate a transaction may be a fixed or variable amount, and may be predetermined based on any number of considerations (such as the average price of the entries), or may be determined by some other method (such as whether the range is less than a predetermined percentage of the sell price). Of course, these are examples only and the buy and sell prices might be equal, or the buy price might be higher than the sell price. System 10 might also require that the buy and sell prices be equal prior to initiating an exchange. Further, even if the buy and sell prices are equal (or otherwise meet a certain range criterion), system 10 may be configured to not initiate an exchange of the entry unless one or more additional criteria are met.

System 10 is preferably operable to manage multiple transactions for multiple entries in multiple activities. For example, there may be a plurality of buyers and sellers, each attempting to buy or sell multiple entries in a basketball tournament and multiple entries in a horse race. Moreover, for any single activity, such as a basketball tournament for example, system 10 manages transactions involving multiple instances of the same entry. For instance, in an NCAA basketball tournament, if the "entries" are the individual teams, then there are sixty-four entries. System 10 preferably manages multiple instances of each of the sixty-four teams. This might be the case if there is an initial distribution of the sixty-four teams, followed by a second distribution of the sixty-four teams. Each team would have two entries in the system (one for each of the distributions). If the teams were designated as numbers 1-64, and if the distributions were designated as a, b, c and so on, then there would be an entry $1a, 1b, 1c \ldots 1n, 2a, 2b, 2c \ldots 2n, 3a, 3b, 3c \ldots 3n$, and so on up to entry $64n$ (n being determined by the number of distributions). In the case of multiple distributions, the assets accumulated from the initial distribution may be either pooled or segregated, as desired.

In the example of a single distribution of entries in an NCAA tournament, the entries would be initially distributed as described elsewhere herein. At a later time, if a first user wanted to purchase an entry, he would use client 20 to communicate his purchase request to exchange platform 16 via exchange system interface 14. Exchange platform would then determine whether there is any action necessary with respect to the purchase request. For example, exchange platform 16 might first determine whether the purchase request is valid or meets certain parameters. For instance, if the purchase request is for a team that is not in the tournament, then the request would not be valid. If the purchase request only provided the desired entry, but without a purchase price, the request would similarly be invalid. Exchange platform 16 might be configured to require certain credit, password, identity, and/or location information. If any of this information is either not provided, or determined to be insufficient, then exchange platform 16 makes a determination that the purchase request does not meet the required parameters. Assuming the purchase request is valid, then the exchange platform 16 communicates a display instruction to exchange interface 14, according to which exchange interface 14 displays the purchase request so that potential sellers may see the request and respond with a different purchase request or a sell request. These follow up requests need not wait until the first user's purchase request, however.

Similarly, a second user may communicate a sell request to exchange platform 16 via exchange interface 14. Again, exchange platform 16 may make a determination as to what, if any, action to take in response to the second user's sell request. As described above, one possible result is that the sell request is validated and a display instruction is sent to the exchange interface 14.

In response to any sell or purchase request, exchange platform 16 may determine that the appropriate action is to initiate an exchange of an entry between a particular seller and a particular buyer. This may be determined according to any of the possible scenarios already described elsewhere herein. Once an exchange is initiated, exchange platform 16 conducts the exchange and notifies the buyer and the seller. In one embodiment, the exchange platform 16 conducts the exchange by removing a seller's identifier from, and attaching a buyer's identifier to, a digital representation of the entry. Other methods of actually conducting the transfer of an entry may be incorporated. The transfer may be conducted in response to any number of events including confirmation from the buyer and seller and/or the buyer transmitting appropriate payment instructions.

Payment may be conducted by any suitable method, such as by the use of a debit or credit account, electronic check, or requests to transfer funds from or to a pre-established user account. Thus, the payments may be made manually, or electronically from an account resident within system 10 or external to system 10. For example, if payment is by a debit card, the buyer would enter the appropriate bank information (such as debit card number, expiration date, bank routing number and bank account number). An electronic connection would be established between system 10 and the buyer's bank to conduct the transfer of funds from the buyer's account to an account managed by, or in connection with, system 10. Receipt of funds by a seller are effected in a similar manner.

Exchange system interfaces 14 may include any suitable interface between a client 20 and exchange system platform 16. For example, exchange system interface 14 may comprise a kiosk 26, and automatic teller machine (ATM) 28, a handheld communication device 29 (such as a mobile telephone or a personal data assistant (PDA), one or more telephone operators 34, an Internet exchange provider 46 (via one or more servers, for example), or one or more website(s) 36.

For example, in the case of kiosk 26, a user might purchase entry opportunities, make bids, or otherwise participate in the distribution of entries. The user might also place buy and/or sell requests, retrieve market information, view ancillary information (such as advertising and retail information), and make or receive payments (or confirmation of payments) for transactions. The user might also be able to receive a printout of a particular transaction or of the user's account activity (e.g., showing all of the entries purchased and sold, along with time and price information, for a particular activity, such as a tournament).

Clients 20 may access or communicate with such non-physical interfaces via one or more communication networks 44. Communication networks 44 may include one or more servers, routers, switches, repeaters, backbones, links and/or any other appropriate type of communication devices coupled by links such as wire line, optical, wireless, or other appropriate links. In general, communication network 44 may include any interconnection found on any communication network, such as a telephone network, a local area network (LAN), metropolitan area network (MAN), wide area network (WAN), the Internet, portions of the Internet, or any other data exchange system. To access exchange system interface 14 using communication networks 44, clients 20 may use a computer, a personal digital assistant (PDA), a cell phone, a remote paging device, an electronic mail communication device, a handheld betting device, or any other suitable mobile device. In certain embodiments, clients 20 may receive any suitable information from exchange platform 16 via mobile devices using, for example, communication networks 44 and exchange system interfaces 14.

System 10 may incorporate one or more servers (not explicitly shown), which may host one or more of the exchange system interfaces 14 (such as a website) and which may also host exchange system platform 16 in some embodiments. In some embodiments, information available to clients 20 via an exchange system interface 14 may be updated substantially in real time or at preset intervals (such as every 30 seconds, for example) as new communications are made between users and exchange system platform 16 and/or as information regarding the events, exchange parameters, or activities changes, for example.

In some embodiments, one or more websites 36 may be provided by, or associated with, an Internet exchange provider 46, for example. Internet exchange provider 46 may provide Internet account management by providing online exchange accounts to one or more users. Using an online exchange account, a user may interface with one or more websites 36 associated with the Internet exchange provider 46 in order to fund the account, view exchange information regarding exchange activities, entries and events, and place buy and sell requests. Such online exchange accounts may include one or more various types of accounts, such as deposit accounts, credit accounts, stop-loss accounts, and hybrid accounts, for example.

As shown in FIG. 2, exchange system platform 16 includes a processor 38 coupled to a memory 40. Processor 38 is generally operable to execute various algorithms or calculations to receive, store and communicate exchange information and buy and sell requests, and to conduct transactions necessary for the exchange of entries.

Processor 38 may comprise any suitable processor that executes one or more exchange system software applications 42 or other computer instructions, such as a central processing unit (CPU) or other microprocessor, and may include any suitable number of processors working together. Memory 40 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Memory 40 is generally operable to store various information that may be used by processor 38 in determining actions to take in response to communications from clients 20, and to manage any information necessary for the function of system 10. For example, memory 40 may comprise any suitable number of databases, which may be co-located or physically and/or geographically distributed. In the example shown in FIG. 2, memory 40 may store any or all of the exchange system software applications 42, which may include, without limitation, applications for distributing entries, applications for providing exchange information, applications for receiving, storing, or sending buy and sell requests, applications for conducting exchanges of entries, applications for receiving, storing, updating and communicating entry, activity, and event information, applications for managing event parameters, and applications for conducting payment transactions.

The various event or activity parameters may include, without limitation, any parameters which impact the operation of the exchange, such as, for example, the type of activity and/or event, the time, date and location of the activity and/or event, the number (or in some cases, the name) of each of the entries, the identity of the users, the manner in which the exchange is accessed (such as via telephone, the Internet, or kiosk, for example), the type of request, commission rates or takeouts, entry and pricing information associated with the request.

Activity results 64 may comprise various data regarding the results of one or more activities, such as the final position of each entry in a competition, whether there was a tie for any position and/or whether entry did not finish the activity, for example. User results 66 may comprise various data regarding the results of various buy and sell requests and payout information, such as the identity of the user who has a winning entry, the determined payout for the entry and/or whether the payout was distributed to the user, for example.

As discussed above, one or more communication networks 18 couple and facilitate wireless or wireline communication between one or more exchange system interfaces 14 and exchange system platform 16. Each communication network 18 may include one or more servers, routers, switches, repeaters, backbones, links and/or any other appropriate type of communication devices coupled by links such as wire line, optical, wireless, or other appropriate links. In general, each communication network 18 may include any interconnection found on any communication network, such as a local area network (LAN), metropolitan area network (MAN), wide area network (WAN), the Internet, portions of the Internet, or any other data exchange system.

As discussed above, processor 38 is operable to execute exchange system software applications 42. Processor 38 may execute applications 42 based on data received from memory 40 and/or one or more exchange system interfaces 14. In addition, processor 38 may update exchange system data based on new information being received by exchange system platform 16. In some embodiments, processor 38 may update data in real time, substantially in real time, or at preset intervals (such as every thirty seconds, for example).

As shown in FIG. 2, exchange system data may be communicated to one or more exchange system interfaces 14 via communication network 18. Current exchange system data may then be made available to clients 20, such as via tote boards or monitors, or on an appropriate one of website(s) 36 that may be accessed by clients 20, for example. In this manner, users may have access to real-time or substantially real-time current exchange system data regarding various activities, events and parameters.

Further Embodiments

The following should be interpreted as further embodiments and not as claims.

A1. A method for conducting an exchange, comprising:
distributing a first set of entries in at least one activity;
conducting after market trading of at least one of the entries between at least one buyer and at least one seller.

A2. The method of A1, wherein the step of conducting after market trading comprises:
receiving, from a first user, at least one buy request associated with at least one entry of the first set of entries;
receiving, from a second user, at least one sell request associated with the at least one entry of the first set of entries;
matching the at least one buy request with the at least one sell request; and
transferring the at least one entry of the first set of entries from the second user to the first user.

A3. The method of A1, wherein the step of conducting after market trading comprises:
receiving, from a first user, a buy order associated with at least one entry of the first set of entries;
receiving, from a second user, a short sale order associated with the at least one entry of the first set of entries;
matching the buy order with the at least one short sale order to create a short sale;
settling, at a predetermined time, the short sale.

A4. The method of A1, wherein distributing comprises conducting a lottery for the first set of entries.

A5. The method of A1, wherein distributing comprises conducting an auction for the first set of entries.

A6. The method of A1, further comprising distributing a second set of entries for the first activity and conducting after market trading of the second set of entries.

A7. The method of A6, wherein the after market trading of the first set of entries is discrete from the after market trading of the second set of entries.

A8. The method of A6, wherein the after market trading of the first set of entries is commingled with the after market trading of the second set of entries.

A9. The method of A1, further comprising distributing a second set of entries for a second activity.

A10. The method of A9, wherein the first activity is the same type of activity as the second activity.

A11. The method of A9, wherein the first activity is a different type of activity from the second activity.

A12. The method of A9, wherein the after market trading of the first set of entries is discrete from the after market trading of the second set of entries.

A13. The method of A9, wherein the after market trading of the first set of entries is commingled with the after market trading of the second set of entries.

A14. The method of A1, wherein the after market trading of the first set of entries comprises conducting an auction of at least one entry of the first set of entries.

A15. The method of A14, wherein conducting the auction comprises receiving from a first user a request to auction at least one entry held by the first user, and receiving from a second user a first bid request for the at least one entry.

A16. The method of A15, further comprising receiving from a third user a second bid request higher than the first bid request and transferring the at least one entry to the third user.

A17. The method of A1, wherein the activity is a sports activity.

A18. The method of A1, wherein the activity is an entertainment activity.

A19. The method of A1, wherein the activity is a competition.

A20. The method of A1, wherein the activity is a financial market activity.

A21. The method of A1, wherein the activity is a tournament.

A22. The method of A1, wherein the activity is a single game.

A23. The method of A1, wherein the activity is a basketball tournament.

A24. The method of A1, wherein the activity is a political election.

A25. The method of A1, further comprising accepting payment for the entry from the first user.

A26. The method of A1, further comprising accepting confirmation of payment for the entry by the first user.

A27. The method of A1, further comprising distributing all or a portion of the entries in a single bundle to one or more users.

A28. The method of A27, wherein the single bundle is distributed prior to conducting the after market trading of the first set of entries.

A29. The method of A27, wherein the single bundle is distributed after commencement of the after market trading of the first set of entries.

A30. The method of A1, wherein conducting the after market trading comprises receiving a short sell order from a first user and a buy order from a second user.

A31. The method of A1, wherein the after market trading comprises conducting at least one transfer of at least one entry.

A32. The method of A1, wherein the after market trading comprises conducting at least one sale of at least one entry.

A33. The method of A1, wherein the after market trading comprises conducting at least one short sale.

A34. The method of A1, wherein the after market trading comprises at least one auction.

A35. The method of A34, wherein the auction comprises an auction in which a payout of a certain minimum amount at a certain time is guaranteed to be made to the holder of a winning entry.

A36. The method of A1, further comprising determining at least one winning entry at least one predetermined time and paying a payout to the holder of the at least one winning entry.

A37. The method of A36, wherein the payout is money.

A38. The method of A36, wherein the payout is a non-cash prize.

A39. The method of A36, wherein the payout comprises at least a portion of fees paid for the first set of entries during the distributing step.

A40. The method of A36, wherein the payout is based on an amount of revenues generated by the distributing step.

A41. The method of A1, further comprising receiving a commission or fee for the transfer of at least one entry.

A42. The method of A1, wherein the after market trading begins as soon as at least one entry is distributed.

A43. The method of A1, wherein the after market trading begins after all of the entries are distributed.

A44. The method of A1, wherein the after market trading begins after a predetermined number of entries are distributed.

A45. The method of A1, wherein the after market trading is closed at a predetermined time.

A46. The method of A1, wherein the after market trading is closed before the start of the activity.

A47. The method of A1, wherein the after market trading is closed at the end of the activity.

B1. An exchange system for conducting the exchange of an interest in at least one entry in an activity, the system comprising:

a processor operable to transfer the interest from a first user to a second user.

B2. The exchange system of B1, wherein the interest is the at least one entry, and wherein the processor is further operable to receive a buy request from the second user and a sell request from the first user, and is operable to match the buy request and the sell request, and operable to transfer the entry from the first user to the second user.

B3. The exchange system of B1, wherein the interest is a short position in the at least one entry, and wherein the processor is further operable to receive a short sale order from the second user and a buy order from the first user, and is operable to match the short sale order with the buy order to create a short sale, and operable to settle the short sale at a predetermined time.

B4. The exchange system of B1, wherein the processor is further operable to distribute the entries.

B5. The exchange system of B1, wherein the entries are distributed according to a lottery.

B6. The exchange system of B1, wherein the entries are distributed according to an auction.

B7. The exchange system of B1, further comprising a memory operable to store at least one entry associated with an identity of at least one user.

Although embodiments of the invention and their advantages are described in detail, a person skilled in the art could make various alterations, additions, and omissions without departing from the spirit and scope of the present invention as defined by the appended claims.

What is claimed is:

1. An apparatus, comprising:
    a processor; and
    a memory, in which the memory stores instructions, which, when executed, cause the processor to:
        determine a first set of entries in a sports competition, in which each entry of the first set of entries corresponds to a respective participant of a set of participants participating in the sports competition and in which the sports competition has one or more stages;
        receive a buy order placed by a first user of a plurality of users, in which the buy order is associated with at least one entry of the first set of entries;
        receive a sell order placed by a second user of the plurality of users associated with the at least one entry of the first set of entries, in which the second user does not own the at least one entry at a time the sell order is placed;
        match the buy order with the sell order thereby creating a short sale of the at least one entry to the first user;
        settle with the second user, at a predetermined time, any differential between a first price of the at least one entry at the time the sell order is placed and a second price of the at least one entry at the predetermined time;
        determine a winning entry of the first set of entries based on at least one first outcome of the sports competition; and
        determine a payout, in which the payout is paid to one or more users who hold the winning entry.

2. The apparatus of claim 1, in which the set of participants comprises a set of teams.

3. The apparatus of claim 1, in which the set of participants comprises a set of individuals.

4. The apparatus of claim 1, in which the instructions, when executed, further cause the processor to:
    pay the payout to the one or more users who hold the winning entry.

5. The apparatus of claim 1, in which the instructions, when executed, further cause the processor to:
    distribute the first set of entries to the plurality of users.

6. The apparatus of claim 5, in which distributing the first set of entries comprises conducting a lottery for the first set of entries.

7. The apparatus of claim 5, in which distributing the first set of entries comprises conducting an auction for the first set of entries.

8. The apparatus of claim 5, in which the instructions, when executed, further cause the processor to:
    distribute a second set of entries for the sports competition; and
    conduct trading of at least one entry of the second set of entries.

9. The apparatus of claim 8, in which any trading of entries of the first set of entries is discrete from the trading of entries of the second set of entries.

10. The apparatus of claim 8, in which any trading of entries of the first set of entries is commingled with the trading of entries of the second set of entries.

11. The apparatus of claim 5, in which the instructions, when executed, further cause the processor to:
    distribute a second set of entries for an activity; and
    conduct trading of at least one entry of the second set of entries.

12. The apparatus of claim 11, in which the activity comprises a second sports competition.

13. The apparatus of claim 11, in which the activity comprises a financial market activity.

14. The apparatus of claim 11, in which any trading of entries of the first set of entries is discrete from the trading of entries of the second set of entries.

15. The apparatus of claim 11, in which any trading of entries of the first set of entries is commingled with the trading of entries of the second set of entries.

16. The apparatus of claim 1, in which the instructions, when executed, further cause the processor to:
    receive from the first user a request to auction the at least one entry; and
    receive from a third user of the plurality of users a first bid request for the at least one entry.

17. The apparatus of claim 16, in which the instructions, when executed, further cause the processor to:
    receive from a fourth user of the plurality of users a second bid request higher than the first bid request; and
    transfer the at least one entry to the fourth user.

18. The apparatus of claim 1, in which the instructions, when executed, further cause the processor to:
    accept payment for the at least one entry from the first user.

19. The apparatus of claim 1, in which the instructions, when executed, further cause the processor to:
    accept confirmation of payment for the at least one entry by the first user.

20. The apparatus of claim 5, in which distributing the first set of entries comprises distributing all or a portion of the first set of entries in a single bundle to one or more users of the plurality of users.

21. The apparatus of claim 20, in which the single bundle is distributed prior to conducting any trading of entries of the first set of entries.

22. The apparatus of claim 20, in which the single bundle is distributed after commencement of any trading of entries of the first set of entries.

23. The apparatus of claim 1, in which the payout comprises money.

24. The apparatus of claim 1, in which the payout comprises a non-cash prize.

25. The apparatus of claim 5, in which the payout comprises at least a portion of fees paid for the first set of entries during the distributing of the first set of entries.

26. The apparatus of claim 5, in which the payout is at least partially based on an amount of revenues generated by the distributing of the first set of entries.

27. The apparatus of claim 1, in which the instructions, when executed, further cause the processor to:
    receive a commission for transfer of one or more entries of the first set of entries.

28. The apparatus of claim 5, in which any trading of the first set of entries begins as soon as one or more entries of the first set of entries are distributed.

29. The apparatus of claim 5, in which any trading of the first set of entries begins after all of the first set of entries is distributed.

30. The apparatus of claim 5, in which any trading of the first set of entries begins after a predetermined number of entries of the first set of entries are distributed.

31. The apparatus of claim 1, in which any trading of the first set of entries is closed at a predetermined time.

32. The apparatus of claim 1, in which any trading of the first set of entries is closed before a start of the sports competition.

33. The apparatus of claim 1, in which any trading of the first set of entries is closed at an end of the sports competition.

34. The apparatus of claim 1, in which the sports competition comprises a sports tournament.

35. The apparatus of claim 34, in which the sports tournament comprises a basketball tournament.

36. The apparatus of claim 35, in which the one or more stages comprise one or more basketball games and the set of participants comprises a set of basketball teams.

37. The apparatus of claim 34, in which the sports tournament comprises a soccer tournament.

38. The apparatus of claim 1, in which the sports competition comprises a single game competition.

39. The apparatus of claim 38, in which the single game competition comprises a baseball game.

40. The apparatus of claim 38, in which the single game competition comprises a basketball game.

41. The apparatus of claim 38, in which the single game competition comprises a hockey game.

42. The apparatus of claim 38, in which the single game competition comprises a soccer game.

43. The apparatus of claim 38, in which the single game competition comprises a football game.

44. The apparatus of claim 43, in which the stages comprise quarters of the football game.

45. The apparatus of claim 1, in which the instructions, when executed, further cause the processor to:
artificially set prices of the first set of entries based on a performance of the set of participants.

46. The apparatus of claim 1, in which the instructions, when executed, further cause the processor to:
determine prices of the first set of entries according to market exchanges of the set of entries between at least the plurality of users.

47. The apparatus of claim 1, in which the instructions, when executed, further cause the processor to:
store the buy order in the memory; and
store the sell order in the memory.

48. A method, comprising:
determining, by a processor of a computer, a first set of entries in a sports competition, in which each entry of the first set of entries corresponds to a respective participant of a set of participants participating in the sports competition and in which the sports competition has one or more stages;
receiving, by the processor, a buy order placed by a first user of a plurality of users, in which the buy order is associated with at least one entry of the first set of entries;
receiving, by the processor, a sell order placed by a second user of the plurality of users associated with the at least one entry of the first set of entries, in which the second user does not own the at least one entry at a time the sell order is placed;
matching, by the processor, the buy order with the sell order thereby creating a short sale of the at least one entry to the first user;
settling, by the processor, with the second user, at a predetermined time, any differential between a first price of the at least one entry at the time the sell order is placed and a second price of the at least one entry at the predetermined time;
determining, by the processor, a winning entry of the first set of entries based on at least one first outcome of the sports competition; and
determining, by the processor, a payout, in which the payout is paid to one or more users who hold the winning entry.

49. The method of claim 48, in which the set of participants comprises a set of teams.

50. The method of claim 48, in which the set of participants comprises a set of individuals.

51. The method of claim 48, further comprising:
paying the payout to the one or more users who hold the winning entry.

52. The method of claim 51, wherein paying the payout comprises:
paying, by the processor, the payout to the one or more users who hold the winning entry.

53. The method of claim 48, further comprising:
distributing the first set of entries to the plurality of users.

54. The method of claim 53, wherein paying the payout comprises:
distributing, by the processor, the first set of entries to the plurality of users.

55. The method of claim 53, in which distributing the first set of entries comprises conducting a lottery for the first set of entries.

56. The method of claim 53, in which distributing the first set of entries comprises conducting an auction for the first set of entries.

57. The method of claim 53, further comprising:
distributing a second set of entries for the sports competition; and
conducting trading of at least one entry of the second set of entries.

58. The method of claim 57, in which any trading of entries of the first set of entries is discrete from the trading of entries of the second set of entries.

59. The method of claim 57, in which any trading of entries of the first set of entries is commingled with the trading of entries of the second set of entries.

60. The method of claim 53, further comprising:
distributing a second set of entries for an activity; and
conducting trading of at least one entry of the second set of entries.

61. The method of claim 60, in which the activity comprises a second sports competition.

62. The method of claim 60, in which the activity comprises a financial market activity.

63. The method of claim 60, in which any trading of entries of the first set of entries is discrete from the trading of entries of the second set of entries.

64. The method of claim 60, in which any trading of entries of the first set of entries is commingled with the trading of entries of the second set of entries.

65. The method of claim 48, further comprising:
receiving from the first user a request to auction the at least one entry; and
receiving from a third user of the plurality of users a first bid request for the at least one entry.

66. The method of claim 65, further comprising:
receiving from a fourth user of the plurality of users a second bid request higher than the first bid request; and
transferring the at least one entry to the fourth user.

67. The method of claim 48, further comprising:
accepting payment for the at least one entry from the first user.

68. The method of claim 48, further comprising:
accepting confirmation of payment for the at least one entry by the first user.

69. The method of claim 53, in which distributing the first set of entries comprises distributing all or a portion of the first set of entries in a single bundle to one or more users of the plurality of users.

70. The method of claim 69, in which the single bundle is distributed prior to conducting any trading of entries of the first set of entries.

71. The method of claim 69, in which the single bundle is distributed after commencement of any trading of entries of the first set of entries.

72. The method of claim 48, in which the payout comprises money.

73. The method of claim 48, in which the payout comprises a non-cash prize.

74. The method of claim 53, in which the payout comprises at least a portion of fees paid for the first set of entries during the distributing of the first set of entries.

75. The method of claim 53, in which the payout is at least partially based on an amount of revenues generated by the distributing of the first set of entries.

76. The method of claim 48, further comprising:
receiving a commission for transfer of one or more entries of the first set of entries.

77. The method of claim 53, in which any trading of the first set of entries begins as soon as one or more entries of the first set of entries are distributed.

78. The method of claim 53, in which any trading of the first set of entries begins after all of the first set of entries is distributed.

79. The method of claim 53, in which any trading of the first set of entries begins after a predetermined number of entries of the first set of entries are distributed.

80. The method of claim 48, in which any trading of the first set of entries is closed at a predetermined time.

81. The method of claim 48, in which any trading of the first set of entries is closed before a start of the sports competition.

82. The method of claim 48, in which any trading of the first set of entries is closed at an end of the sports competition.

83. The method of claim 48, in which the sports competition comprises a sports tournament.

84. The method of claim 83, in which the sports tournament comprises a basketball tournament.

85. The method of claim 84, in which the one or more stages comprise one or more basketball games and the set of participants comprises a set of basketball teams.

86. The method of claim 83, in which the sports tournament comprises a soccer tournament.

87. The method of claim 48, in which the sports competition comprises a single game competition.

88. The method of claim 87, in which the single game competition comprises a baseball game.

89. The method of claim 87, in which the single game competition comprises a basketball game.

90. The method of claim 87, in which the single game competition comprises a hockey game.

91. The method of claim 87, in which the single game competition comprises a soccer game.

92. The method of claim 87, in which the single game competition comprises a football game.

93. The method of claim 92, in which the stages comprise quarters of the football game.

94. The method of claim 48, further comprising:
artificially setting prices of the first set of entries based on a performance of the set of participants.

95. The method of claim 48, further comprising:
determining prices of the first set of entries according to market exchanges of the set of entries between at least the plurality of users.

96. The method of claim 48, further comprising:
storing the buy order in a memory; and
storing the sell order in a memory.

97. An article of manufacture, comprising:
a non-transitory tangible memory, in which the memory stores instructions, which, when executed, cause a processor to:
determine a first set of entries in a sports competition, in which each entry of the first set of entries corresponds to a respective participant of a set of participants participating in the sports competition and in which the sports competition has one or more stages;
receive a buy order placed by a first user of a plurality of users, in which the buy order is associated with at least one entry of the first set of entries;
receive a sell order placed by a second user of the plurality of users associated with the at least one entry of the first set of entries, in which the second user does not own the at least one entry at a time the sell order is placed;
match the buy order with the sell order thereby creating a short sale of the at least one entry to the first user;
settle with the second user, at a predetermined time, any differential between a first price of the at least one entry at the time the sell order is placed and a second price of the at least one entry at the predetermined time;
determine a winning entry of the first set of entries based on at least one first outcome of the sports competition; and
determine a payout, in which the payout is paid to one or more users who hold the winning entry.

98. The article of manufacture of claim 97, in which the set of participants comprises a set of teams.

99. The article of manufacture of claim 97, in which the set of participants comprises a set of individuals.

100. The article of manufacture of claim 97, in which the instructions, when executed, further cause the processor to:
pay the payout to the one or more users who hold the winning entry.

101. The article of manufacture of claim 97, in which the instructions, when executed, further cause the processor to:
distribute the first set of entries to the plurality of users.

102. The article of manufacture of claim 101, in which the instructions, when executed, further cause the processor to:
distribute a second set of entries for the sports competition; and
conduct trading of at least one entry of the second set of entries.

103. The article of manufacture of claim 101, in which the instructions, when executed, further cause the processor to:
distribute a second set of entries for an activity; and
conduct trading of at least one entry of the second set of entries.

104. The article of manufacture of claim 97, in which the instructions, when executed, further cause the processor to:
receive from the first user a request to auction the at least one entry; and
receive from a third user of the plurality of users a first bid request for the at least one entry.

105. The article of manufacture of claim 97, in which the instructions, when executed, further cause the processor to:
accept payment for the at least one entry from the first user.

106. The article of manufacture of claim 97, in which the instructions, when executed, further cause the processor to:
   accept confirmation of payment for the at least one entry by the first user.

107. The article of manufacture of claim 101, in which distributing the first set of entries comprises distributing all or a portion of the first set of entries in a single bundle to one or more users of the plurality of users.

108. The article of manufacture of claim 97, in which the instructions, when executed, further cause the processor to:
   receive a commission for transfer of one or more entries of the first set of entries.

109. The article of manufacture of claim 97, in which the sports competition comprises a sports tournament.

110. The article of manufacture of claim 97, in which the sports competition comprises a single game competition.

111. The article of manufacture of claim 97, in which the instructions, when executed, further cause the processor to:
   artificially set prices of the first set of entries based on a performance of the set of participants.

112. The article of manufacture of claim 97, in which the instructions, when executed, further cause the processor to:
   determine prices of the first set of entries according to market exchanges of the set of entries between at least the plurality of users.

\* \* \* \* \*